US012760581B2

(12) United States Patent
Hawkins et al.

(10) Patent No.: US 12,760,581 B2
(45) Date of Patent: Oct. 13, 2026

(54) MODULAR DOOR OPENER SYSTEM

(71) Applicant: Automatic Technology (Australia) Pty Ltd, Clayton (AU)

(72) Inventors: Raymond Hawkins, Victoria (AU); Zhihua Guan, Glen Waverley (AU); Sam Saliba, Yagoona (AU); Samuel Goldstein, Paddington (AU)

(73) Assignee: AUTOMATIC TECHNOLOGY (AUSTRALIA) PTY LTD, Clayton (AU)

( * ) Notice: Subject to any disclaimer, the term of this patent is extended or adjusted under 35 U.S.C. 154(b) by 222 days.

(21) Appl. No.: 18/645,842

(22) Filed: Apr. 25, 2024

(65) Prior Publication Data

US 2025/0333994 A1 Oct. 30, 2025

(51) Int. Cl.
*E05F 15/668* (2015.01)
*E05F 15/77* (2015.01)

(52) U.S. Cl.
CPC ............ *E05F 15/668* (2015.01); *E05F 15/77* (2015.01); *E05Y 2201/216* (2013.01); *E05Y 2201/434* (2013.01); *E05Y 2201/71* (2013.01); *E05Y 2400/36* (2013.01); *E05Y 2400/61* (2013.01); *E05Y 2900/106* (2013.01); *E05Y 2900/132* (2013.01)

(58) Field of Classification Search
CPC .. E05F 15/668; E05F 15/77; E05Y 2201/216; E05Y 2201/434; E05Y 2201/71; E05Y 2400/36; E05Y 2400/61; E05Y 2400/106; E05Y 2400/132
USPC ........................................................... 310/46
See application file for complete search history.

(56) References Cited

U.S. PATENT DOCUMENTS

| | | | | |
|---|---|---|---|---|
| 7,635,966 | B2 | 12/2009 | Butler | |
| 8,899,553 | B2 * | 12/2014 | Hickerson | A62B 3/005 254/133 R |
| 10,157,538 | B2 * | 12/2018 | McNabb | G07C 9/00182 |
| 10,253,545 | B2 | 4/2019 | Liu | |
| 11,441,347 | B2 * | 9/2022 | Hall | E05F 15/686 |
| 2008/0047672 | A1 * | 2/2008 | Gorman | E05F 15/684 160/1 |

(Continued)

FOREIGN PATENT DOCUMENTS

| | | |
|---|---|---|
| CN | 103498614 A | 1/2014 |
| CN | 204492623 U | 7/2015 |

(Continued)

OTHER PUBLICATIONS

International Search Report and Written Opinion in PCT Application PCT/IB2025/054305, mailed Jul. 16, 2025, (12 pages).

*Primary Examiner* — Rashad H Johnson
(74) *Attorney, Agent, or Firm* — NIXON PEABODY LLP

(57) ABSTRACT

A modular door opener system is disclosed. The modular door opener includes a main body defining a control compartment and a support section. A modular mains power cartridge is insertable on the support section to provide power when connected to an external power source. Other mains power cartridges may be inserted to allow different external power sources to be used. A motor is coupled to the main body, opposite the control compartment. The motor is powered by the modular mains power cartridge and controlled by the controller. A worm reducer including a drive shaft is mechanically coupled to the motor.

20 Claims, 21 Drawing Sheets

(56) References Cited

U.S. PATENT DOCUMENTS

| | | | | |
|---|---|---|---|---|
| 2009/0139141 | A1* | 6/2009 | Macleod | E05F 3/02<br>49/21 |
| 2010/0156182 | A1* | 6/2010 | Mertel | E05F 15/668<br>307/66 |
| 2011/0271596 | A1 | 11/2011 | Schaaf | |
| 2012/0023824 | A1* | 2/2012 | Mason | E05F 15/63<br>49/340 |
| 2015/0368958 | A1* | 12/2015 | Bartholdi | E06B 7/28<br>49/352 |
| 2017/0106900 | A1* | 4/2017 | Sakai | B62D 5/0403 |
| 2018/0305968 | A1* | 10/2018 | Ferri | F16H 57/035 |
| 2019/0119971 | A1* | 4/2019 | Staehlin | E05F 17/002 |
| 2019/0360266 | A1 | 11/2019 | Rejc | |
| 2022/0162896 | A1* | 5/2022 | Chan | E05F 1/1253 |
| 2023/0044431 | A1* | 2/2023 | Eliasson | E05F 15/67 |
| 2023/0132122 | A1 | 4/2023 | Evans | |
| 2024/0159096 | A1* | 5/2024 | Seadia | E06B 9/90 |
| 2025/0333994 | A1* | 10/2025 | Hawkins | E05F 15/668 |

FOREIGN PATENT DOCUMENTS

| | | | |
|---|---|---|---|
| CN | 110337524 | B | 1/2022 |
| CN | 116104395 | A | 5/2023 |
| EP | 2060722 | B1 | 4/2011 |
| RS | 52746 | B | 8/2013 |

* cited by examiner

MODULAR DOOR OPENER SYSTEM

TECHNICAL FIELD

The present disclosure relates generally to a mechanized system for operating doors. More particularly, aspects of this disclosure relate to a modular opener unit for operating a door.

BACKGROUND

Large doors such as roller type doors are automated for quick opening and closing to allow access in buildings such as those for manufacturing centers, product distribution centers, automotive service centers, emergency services such as fire and ambulance facilities, commercial and retail centers, car parking facilities, food and hospitality facilities, agricultural facilities, mining facilities, hangers, government centers and the like. Roller type doors have a curtain of slats that may be rolled up in an overhead cylindrical hood. Other large doors may be sectional doors that have panel shaped sections that are linked in articulated fashion. Such doors are typically propelled by a door opener system that includes a motor, a mechanical system such as gears and a chain, a power source and a control system. In the case of roller type doors, the motor rotates a shaft in the overhead hood via a chain and sprocket arrangement that allows the door to be opened by spooling the door in the cylindrical hood and closed by unspooling the door from the cylindrical hood. For sectional overhead doors, the motor will drive a sprocket that rotates a chain loop to drive the door on tracks to open or close.

Currently most door opener systems must be specifically designed for different sized doors that require different power to open and close. Moreover, openers must have different internal power systems to allow for different voltage and current standards in different geographic locations. Current opener systems are also difficult to install as they must be held in position before attachment in a position near the hood.

Thus, there is a need for a modular door opener that may be adapted to operate a variety of door types. There is a further need for a door opener that may be adaptable for different types of power standards. There is a further need for a door opener that facilitates installation in different positions relative to a door.

SUMMARY

One disclosed example is a door opener system including a motor and a mechanical reducer drive assembly mechanically coupled to the motor to drive a shaft for rotating a door mechanism. A control unit is attached to the motor and mechanical drive system. The control unit controls the motor speed. A power interface on the control unit is configured to be coupled to one of a number of identically sized modular mains power cartridges. Each of the modular mains power cartridges allows different power sources to provide power to the motor.

A further implementation of the example door opener system is where the control unit includes a control board compartment holding the control unit, and a power cartridge support. Each of the modular mains power cartridges may be positioned on the power cartridge support in proximity to the control board compartment. Another implementation is where the example opener system includes a remote controller in communication with a control unit. The remote controller communicates via the transceiver to the control unit to operate the motor to drive the shaft. Another implementation is where the control unit communicates with the remote controller via one of a wired connection or a wireless connection. Another implementation is where the remote controller includes a wireless transceiver that is one of a WiFi transceiver or a Bluetooth transceiver. Another implementation is where the remote controller is a mobile computing device. Another implementation is where the motor is a permanent magnet synchronous motor. Another implementation is where the mechanical reducer drive assembly includes a worm gears that mechanically couple the motor to the shaft. Another implementation is where the opener system includes a clutch module including a drive wheel mechanically coupled to the motor, where rotation of the drive wheel rotates the shaft. Another implementation is where the motor includes a motor shaft having a first end mechanically coupled to the mechanical reducer assembly and a second end coupled to a motor bevel gear. The drive wheel is coupled to a manual drive shaft including a drive bevel gear. The drive bevel gear is selectively engageable to the motor bevel gear to allow rotation of the drive wheel to rotate the shaft and is disengaged from the motor bevel gear when power to the motor rotates the motor shaft. Another implementation is where the drive bevel gear is moveable between a disengaged position on the manual drive shaft and an engaged position on the manual drive shaft by rotating the drive wheel. Another implementation is where the opener system includes a magnetic encoder module coupled to the mechanical reducer drive, the magnetic encoder module operable to determine the rotation speed of the shaft. Another implementation is where the opener system includes a modular handle that is attachable to the power unit in place of the modular mains power cartridge.

Another disclosed example is a modular door opener with a main body defining a control compartment and a support section. A modular mains power cartridge is insertable on the support section to provide power when connected to an external power source. A motor is coupled to the main body, opposite the control compartment. The motor is powered by the modular mains power cartridge and controlled by the controller. A worm reducer includes a drive shaft mechanically coupled to the motor.

A further implementation of the example modular door opener includes another modular mains power cartridge is insertable on the support section to provide power when connected to another type of external power source. Another implementation is where the control compartment includes a power connector mateable with a connector on the modular mains power cartridge. The support section includes a registration feature mating with a corresponding feature on the modular mains power cartridge to hold the modular mains power cartridge to the support section. Another implementation is where the example modular door opener includes a modular handle that is attachable to the main body via the registration feature in place of the modular mains power cartridge. Another implementation is where the example modular door opener includes a clutch module including a drive wheel mechanically coupled to the motor, where rotation of the drive wheel rotates the shaft. Another implementation is where the motor is a permanent magnet synchronous motor. Another implementation is where the example modular door opener includes a magnetic encoder module coupled to the worm reducer. The magnetic encoder module determines the rotation speed of the shaft.

The above summary is not intended to represent each embodiment or every aspect of the present disclosure.

Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of embodiments together with reference to the accompanying drawings.

Figure 1A:
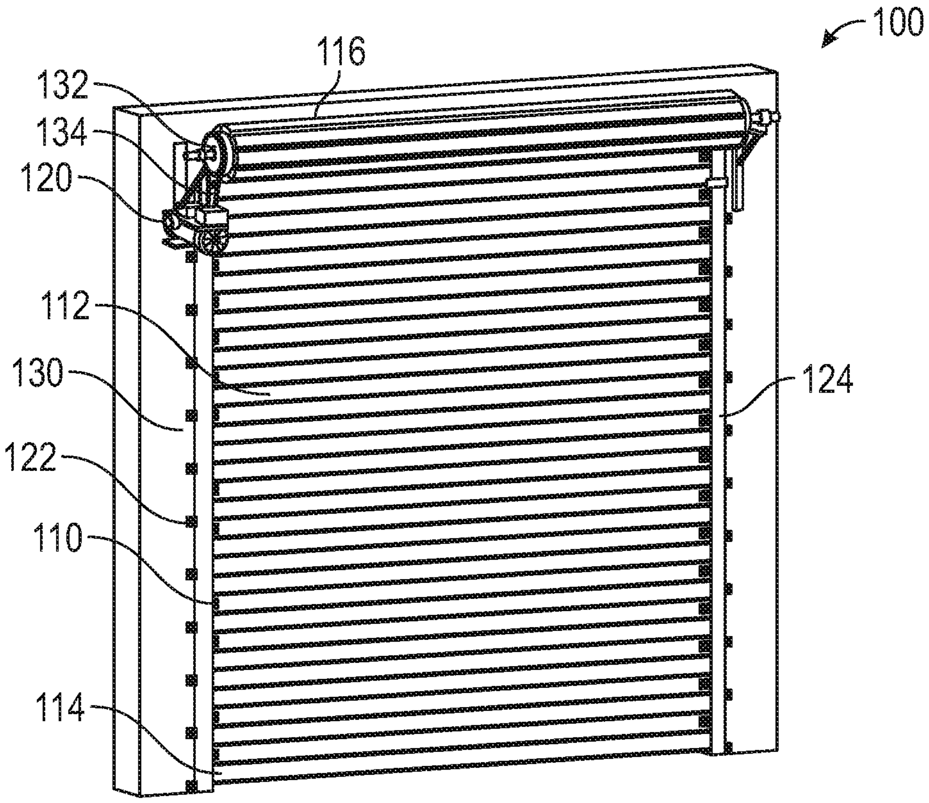
FIG. 1A is a diagram of a rolling door driven by a modular door opener system, according to certain aspects of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost,"

"substantially," "approximately," and the like, can be used herein to mean "at," "near," or "nearly at," or "within 3-5% of," or "within acceptable manufacturing tolerances," or any logical combination thereof, for example.

The present disclosure relates to a modular door opener system. The system has an efficient motor and a modular mechanical assembly with power components. The unit has an efficiently designed form factor that includes a handle between a control compartment and a power cartridge compartment that allows for ease of installation. The form factor includes a power board that is positioned on a heat sink. The motor and worm reducer module are attached below the heat sink. A set of modular mains power cartridges may be plugged in to the unit to allow the unit to operate from different power supplies. A set of different sprockets may be installed to allow the unit to operate different sized doors.

FIG. 1A shows a building 100 that includes a rolling door 110 with an example modular door opener system 120. The rolling door 110 allows access into the building 100 and includes a series of articulated panels that form a curtain assembly 112. One end of the curtain assembly 112 is joined to a bottom bar 114. The top end of the curtain assembly 112 is suspended by a cylindrical hood 116 over the entrance to the building 100. The cylindrical hood 116 may hold the entire curtain assembly 112 when it is rolled up (e.g., when the door 110 is opened). The curtain assembly 112 may be unspooled to close the door 110. The curtain assembly 112 is rotated around a barrel assembly in the cylindrical hood 116.

In this example, the sides of the curtain assembly 112 are mounted in guides 122 and 124 that define the door frame. The curtain assembly 112 thus travels in the guides 122 and 124. The barrel assembly in the hood 116 may be rotated by the door opener system 120 via a sprocket 132 attached to an axle of the barrel assembly or to the barrel itself. The sprocket 132 is rotated via a chain 134 that is rotated by a sprocket and drive shaft of the door opener system 120. The door opener system 120 closes the door 110 by unspooling the curtain assembly 112 and opens the door 110 by spooling the curtain assembly 112 in the cylindrical hood 116. A manual drive chain 130 is attached in a loop to the opener unit 120 and allows manual operation of the door 110 by pulling either end of the chain 130 to open or close the door 110.

Typically, a user may operate the door opener system 120 via a control unit that may be mounted in a convenient location in the building 100 near the door 110. The door opener system 120 includes a motor that may be activated to roll up or unroll the door 110 through commands received from the control unit. As will be explained control of the door opener system 120 may also be made from a mobile computing device such as a mobile phone or the like.

Figure 1B:
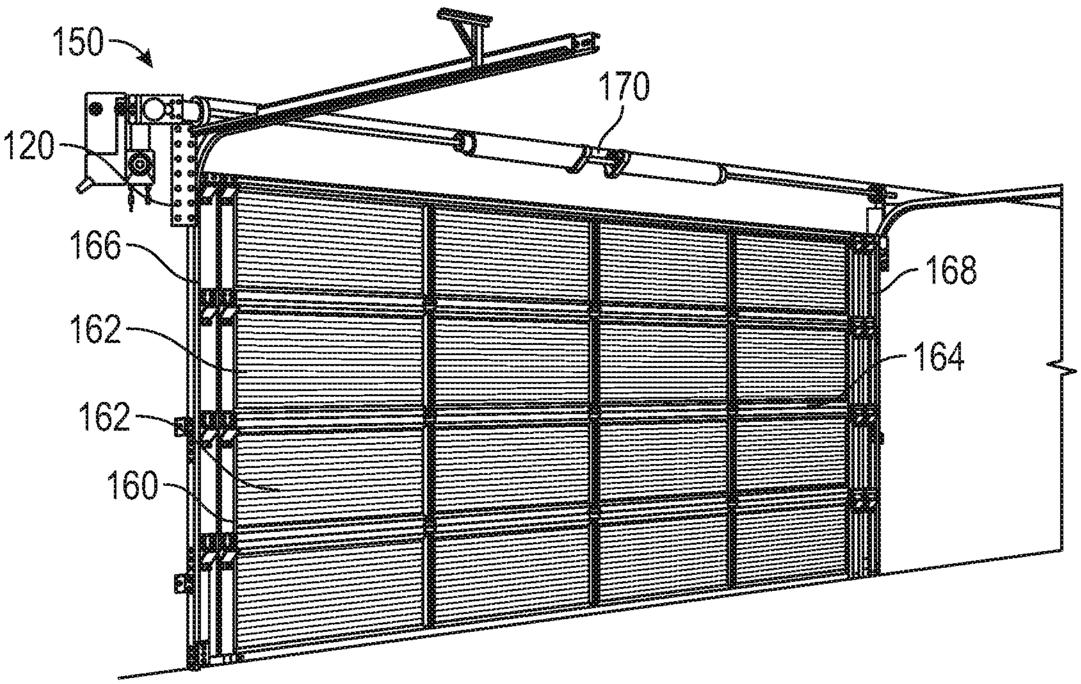
FIG. 1B is a diagram of a panel door driven by the example modular door opener system, according to certain aspects of the present disclosure.

FIG. 1B shows another building 150 that includes a sectional overhead door 160 that is powered by the example modular door opener system 120. The sectional overhead door 160 has a series of articulated panels 162. The panels 162 are connected via a series of hinges 164 that include opposite ends that traverse on a pair of guide rails 166 and 168. A drive axle 170 is mounted between the guide rails 166 and 168. Rotating the drive axle 170 causes the panels 162 to traverse up and down the guide rails 166 and 168 to open and close the door 160. In this example, the end of the drive shaft of the opener system 120 is connected via a coupler to one of the drive axle 170 to rotate the drive axle 170. Other doors and barriers such as roller grills, roll-up sheet doors, bi-fold doors, flexible curtain doors, high speed flexible doors and fire related doors may be powered by the example modular door opener system 120.

Figure 2A:
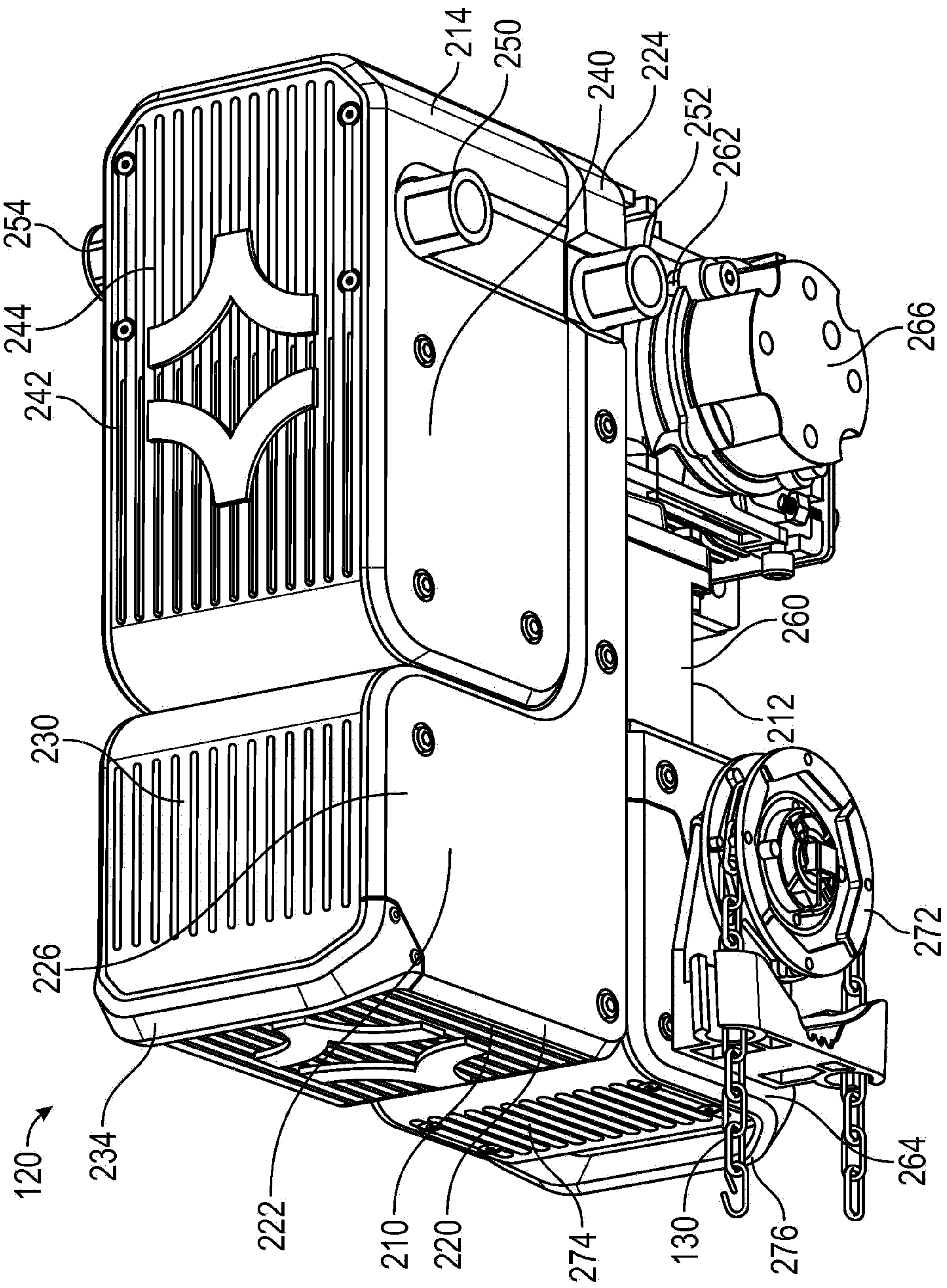
FIG. 2A is a perspective view of the modular door opener system in FIG. 1, according to certain aspects of the present disclosure.
Figure 2B:
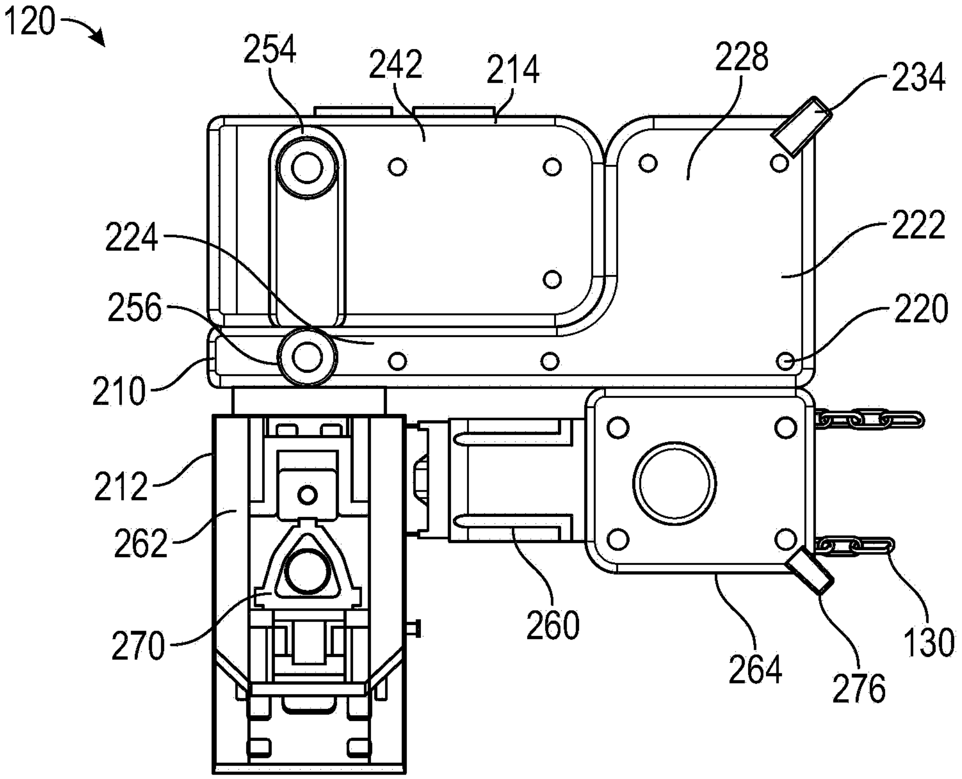
FIG. 2B is a side view of the modular door opener system, according to certain aspects of the present disclosure.
Figure 2C:
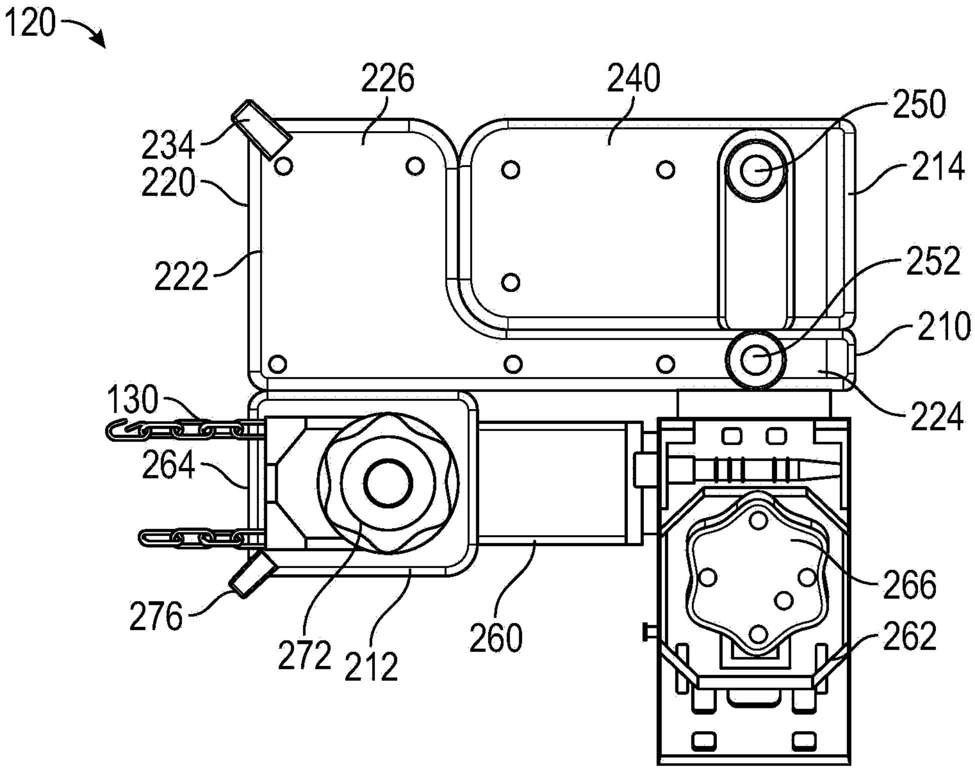
FIG. 2C is an opposite side view of the modular door opener system, according to certain aspects of the present disclosure.
Figure 2D:
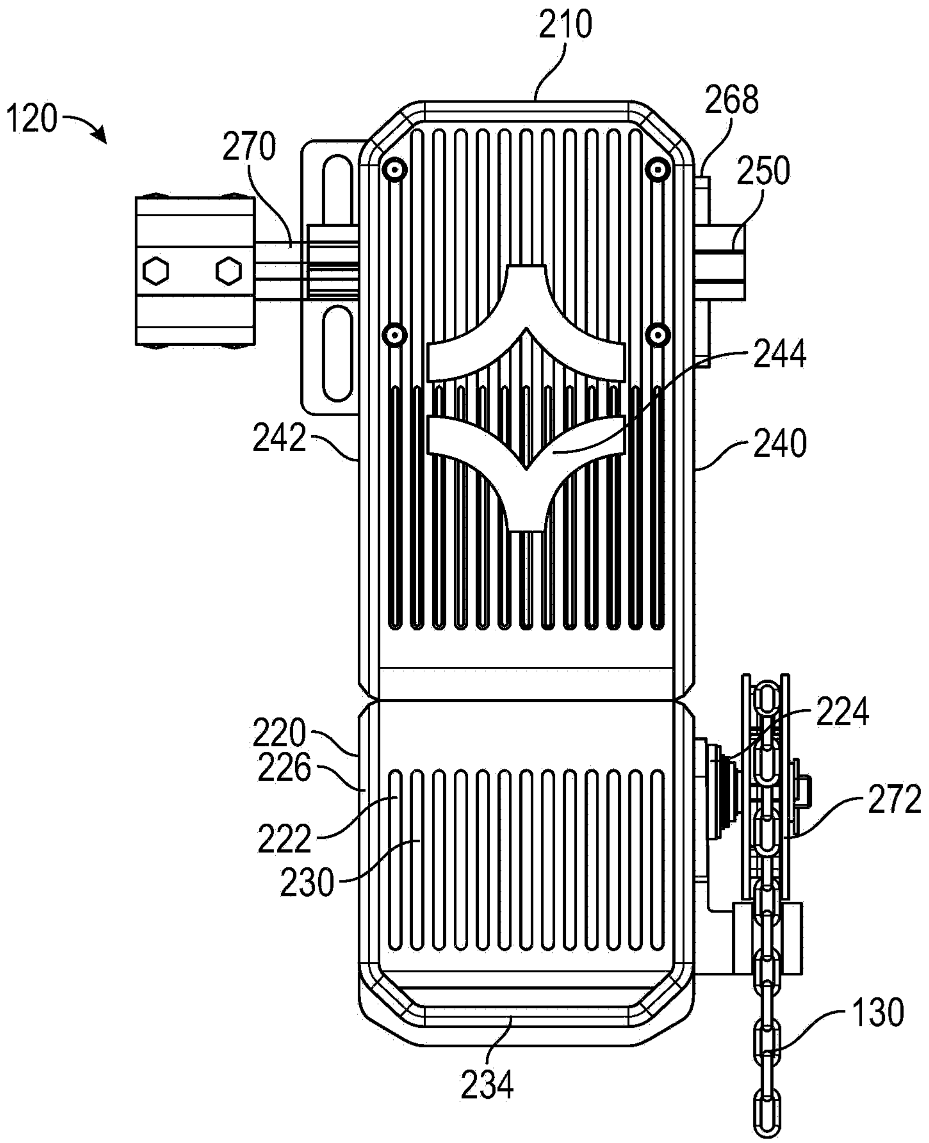
FIG. 2D is a top view of the modular door opener system, according to certain aspects of the present disclosure.

FIG. 2A is a perspective view of the door opener system 120 in FIG. 1. FIG. 2B is a side view of the door opener system 120. FIG. 2C is an opposite side view of the door opener system 120. FIG. 2D is a top view of the door opener system 120. The door opener system 120 includes a control unit 210 that is attached to a drive unit 212. A modular mains power cartridge 214 is coupled to the control unit 210. As will be explained, the control unit 210 provides control signals and supplies electrical power from the modular mains power cartridge 214 to a motor in the drive unit 212. The drive unit 212 includes mechanical components for the motor to rotate a shaft that opens and closes an attached door such as the doors in FIGS. 1A and 1B.

The control unit 210 includes a main body 220 that includes a control board housing 222 and an interface section 224 that supports the modular mains power cartridge 214. The main body 220 two side panels 226 and 228 that define the control board housing 222 and interface section 224. The bottom edges of the side panels 226 and 228 are joined by a plate that is attached to the drive unit 212. The control board housing 222 has a top panel 230 that includes a series of slot apertures to assist in heat dissipation. A handle 234 is supported by one edge of the control board housing 222.

The modular mains power cartridge 214 is generally rectangularly shaped with a pair of side panels 240 and 242. A bottom panel includes electrical connectors that allow the modular mains power cartridge 214 to be attached to the support section 224 of the main body 220. A top panel 244 joins the side panels 240 and 242. The top panel 244 includes a series of slot apertures that allow heat dissipation from an internal heat sink. Two ports 250 and 252 are positioned respectively on the side panel 240 and the side of the support section 224. In this example, the ports 250 and 252 have protective glands attached for guiding cables into the ports 250 and 252. Two ports 254 and 256 are positioned on the opposite side panel 242 and the opposite side of the support section 224. As will be explained power cables may be attached through the ports 250 or 254 on either side of the modular mains power cartridge 214 to provide power to the control unit 210 and the drive unit 212. Control wires may be attached through the ports 252 and 256 to the control board.

The drive unit 212 includes a motor 260, a worm gear reducer module 262, and a clutch module 264. The motor 260 is mechanically coupled to the worm gear reducer module 262 to rotate a drive shaft 270 that extends from one side of the worm reducer module 262. The free end of the drive shaft 270 may be connected to the barrel assembly of the door 110 in FIG. 1. The drive shaft 270 may be rotated either clockwise or counterclockwise by the motor 260 to open or close a roller door. The worm reducer module 262 includes a chain sprocket that is attached to the drive shaft 270. In this example, the motor 260 may be controlled to provide different speeds to the worm gear reducer module 262. This eliminates the need for different chain sprockets to be required for different sized doors, as the rotation of the main drive shaft 270 may be controlled to provide a desired rotation rate.

In this example, the worm gear reducer module 262 has a series of internal worm gears used to reduce the motor speed of 3,000 rpm to 60 rpm with the reducer reduction ratio of 50:1. A magnetic encoder assembly 266 is attached on the opposite side of the worm gear reducer module 262 from the side the main drive shaft 270 extends. The magnetic encoder assembly 266 rotates with the main drive shaft 270 and counts the rotations of the shaft 270 to determine motor speed. In this example, the main drive shaft 270 may be installed to extend from either side of the worm gear reducer module 262. The main drive shaft 270 is typically coupled through a chain and sprocket drive to drive the door. The rotational data from the encoder assembly 266 may be converted to measure door travel and may be used to determine the door open and closed stop limits. The magnetic encoder assembly 266 can be installed on either side of the worm gear reducer module 262 opposite of the extended end of the main shaft 270.

In this example, the motor 260 is a permanent magnet synchronous motor (PMSM). The example PMSM is brushless and has very high reliability and efficiency. The PMSM has a permanent magnet rotor that allows higher relative torque for the motor with a smaller frame size for the motor housing. However, other types of motors may be used to drive the door opener system 120. In this example, the PMSM motor 260 is a three-phase motor, which can provide torque on demand for heavier loads with variable speed with high power efficiency.

The clutch module 264 includes a manual drive wheel 272 that may be rotated by pulling the chain 130 that is looped around the drive wheel 272. The manual drive wheel 272 may be engaged to be mechanically coupled to the shaft of the motor 260 through a series of bevel gears. The drive wheel 272 has a circular groove that guides the chain 130 around the drive wheel 272. The components of the clutch module 264 are contained in a housing 274. The bottom edge of the housing 274 holds a handle 276 to allow a user to hold the opener unit 120. The bevel gears are automatically engaged together when the chain 130 is pulled. When the bevel gears are engaged a microswitch is used to electrically isolate the motor 260 to prevent power to the motor 260 while chain 130 is rotating the manual drive wheel 272 and driving the motor 260 manually. Rotation of the manual drive wheel 272 by the chain 130 allows rotation of the motor 260 and thereby the drive shaft 270 in the worm reducer module 262. The clutch module 264 thus allows manual operation of a door through rotating the drive shaft 270 by pulling one end or the other end of the chain 130.

Figure 3:
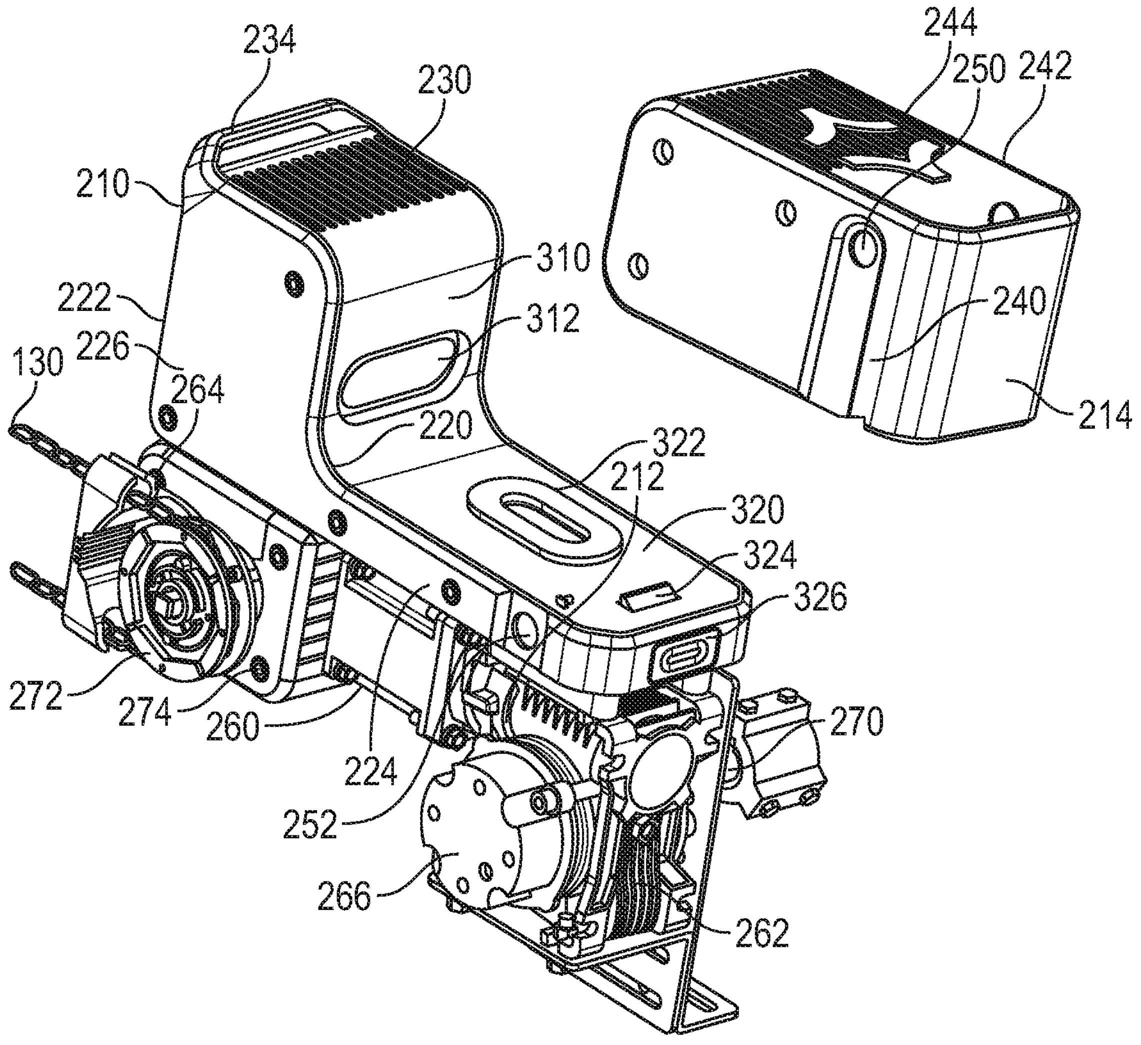
FIG. 3 is an exploded perspective view of the control unit and power mains cartridge module of the door opener system in FIG. 2A, according to certain aspects of the present disclosure.

FIG. 3 is a perspective view of the control unit 210 and drive unit 212 with the modular mains power cartridge 214 removed. The control board housing 222 includes an enclosed end panel 310 that defines a power connector 312. The power connector 312 provides electrical connection to the modular mains power cartridge 214 and provides a physical connection to the modular mains power cartridge 214. The interior of the enclosed end panel 310 supports a main control circuit board that includes control components for the opener system 120. As will be explained the main control circuit board includes communication circuits and control logic for controlling the operation of the door opener system 120, communicating with external systems, as well as storing operational data for diagnostic purposes. The support section 224 includes a plate 320 that supports the modular mains power cartridge 214. The plate 320 includes an ovoid shaped registration feature 322 that mates with rails on the bottom of the modular mains power cartridge 214. A hook 324 engages a latch feature on the modular mains power cartridge 214 and in combination with the registration feature 322 locks the modular mains power cartridge 214 in place on the plate 320. A compressible button 326 at one end of the support section 224, when pressed, releases the hook 324 and thus releases the modular mains power cartridge 214.

The modular mains power cartridge 214 may be inserted on the control unit 210 in the space defined by the control compartment 222 and the interface section 224. The modular mains power cartridge 214 includes all power circuitry to provide power to the other components. In this example, the modular mains power cartridge 214 allows three phase 208/240/277400/480 Volt operation. As will be explained, a second type of modular mains power cartridge having the same physical form factor with identical connectors may replace the modular mains power cartridge 214 and be attached to the control unit 210. The second modular mains power cartridge is a one phase 110/277 Volt power source. Additional modular mains power cartridges may be provided for other power sources if required.

Figure 4A:
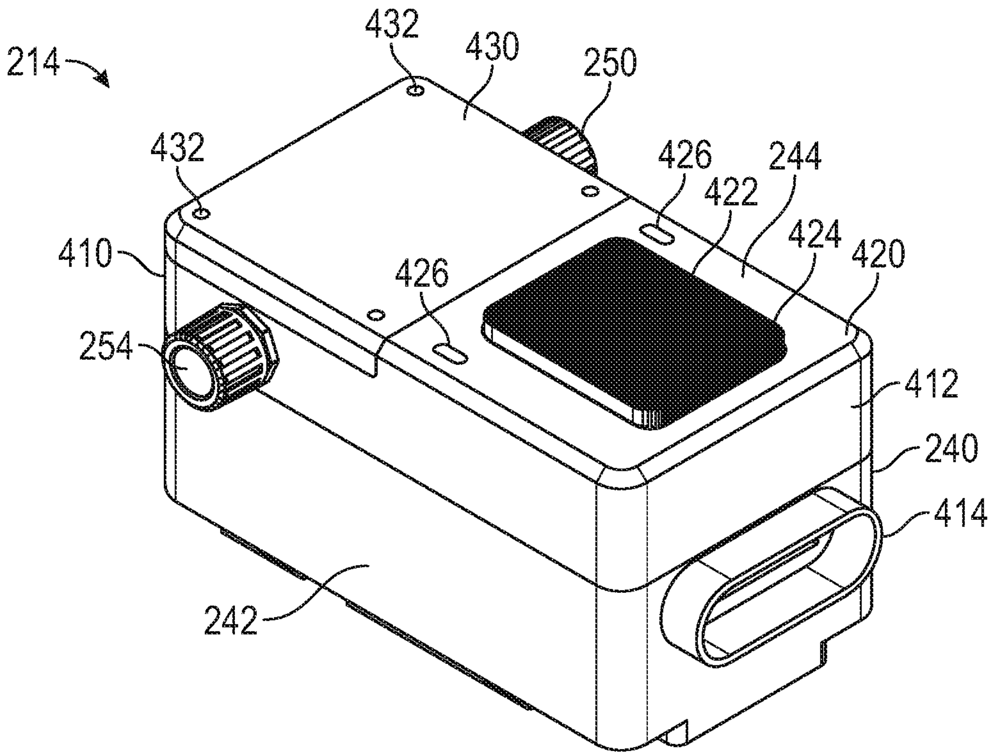
FIG. 4A is a top perspective view of the modular mains power module in FIG. 2A of the door opener system in FIG. 2A, according to certain aspects of the present disclosure.
Figure 4B:
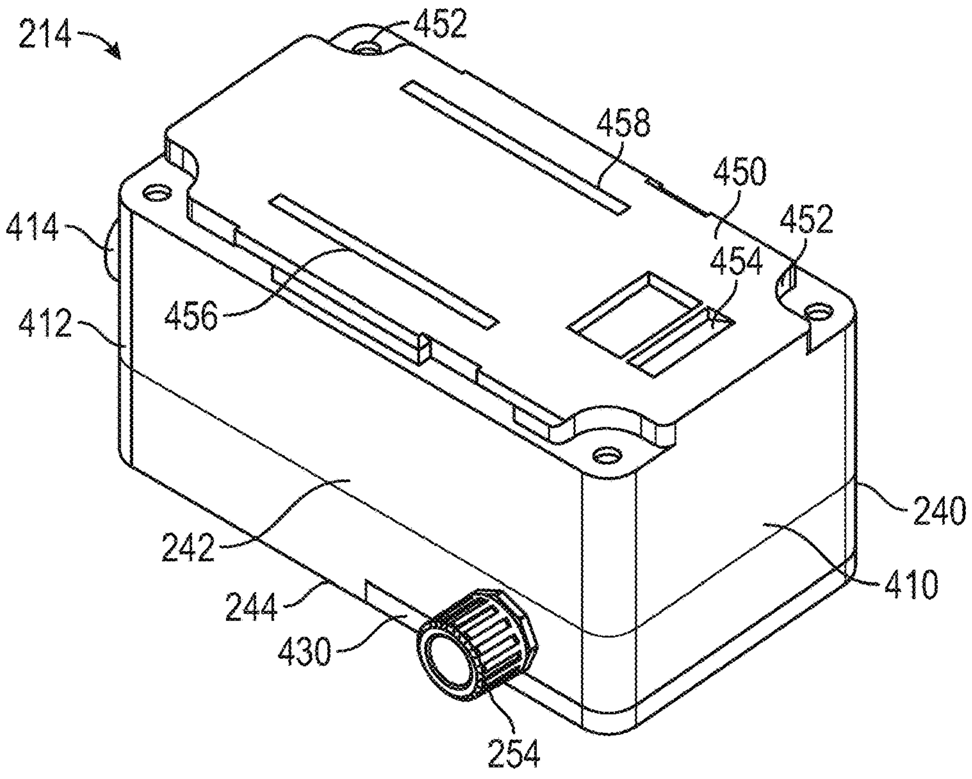
FIG. 4B is a bottom perspective view the modular mains power module in FIG. 2A of the door opener system in FIG. 2A, according to certain aspects of the present disclosure.

FIG. 4A is a top perspective view of the modular mains power module 214. FIG. 4B is a bottom perspective view the modular mains power module 214. The side panels 240 and 242 are joined by an exterior end panel 410 on one side and an interior end panel 412 on the opposite side. The interior end panel 412 is positioned in proximity to the control board compartment 222 of the control unit 210. The interior end panel 412 includes an electrical connector socket 414 that may be plugged into the power connector 312 of the control unit 210.

The top panel 244 includes a fixed cover 420 that holds a heat sink 422. The heat sink 422 includes fins 424 that assist in heat dissipation from the power components in the interior of the modular mains power cartridge 214. In this example, the heat sink 422 is fabricated from aluminum, but any suitable heat conducting metal or alloy may be used. A pair of LEDs 426 are positioned on the edges of the fixed cover 420 to indicate power on in the modular mains power module 214. A removable cover 430 allows access to the interior of the modular mains power cartridge 214. The removable cover 430 is attached to interior flanges on the side panels 240 and 242 via screws 432.

Figure 4C:
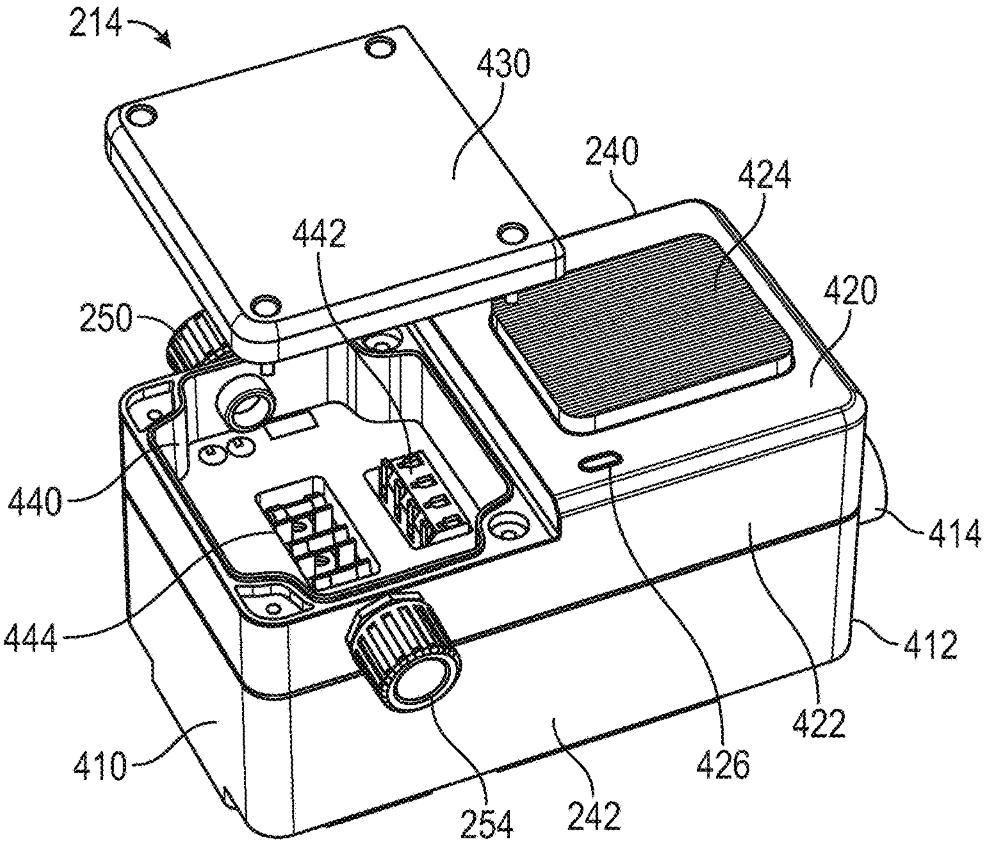
FIG. 4C is a perspective view of the modular mains power module in FIG. 2A with the cover removed, according to certain aspects of the present disclosure.

FIG. 4C shows a perspective view of the modular mains power module 214 with the cover 430 removed. An access compartment 440 is located below the cover 430. The access compartment 440 includes space for power cables to be connected through either the port 450 or 454. In this example, the ports 450 and 454 are normally covered. The ports 450 and 454 may be punched out and a gland may be inserted in the port to guide and hold cables. When the cover 430 is removed, an installer may connect power cables to the modular mains power module 214. The access compartment 440 includes a bank of fuses 442 that may be replaced when the cover 430 is removed. A bank of cable connectors 444 allow cable ends to be electrically connected by a spring activated lever. Of course, other connectors such as screws may be used to electrically connect cable ends.

As shown in FIG. 4B, a bottom panel 450 joins the bottom edges of the side panels 240 and 242. The bottom panel 450 defines four corner indents 452 that allow screws to attach the sides panels 240 and 242 of the modular mains power cartridge 214. The bottom panel 450 also includes a latch 454 that engages the hook 324 of the main body 220 of the control unit 210. The bottom panel 450 has two parallel rails 456 and 458 that engage the registration feature 322.

The modular mains power cartridge 214 may be slid into place so the rails 456 and 458 engage the registration feature 322. The modular mains power cartridge 214 may be pushed toward the end panel 310 until the connector socket 414 engages the connector 312. When the modular mains power cartridge 214 is pushed all the way in, the hook 324 engages the latch 454 to lock the modular mains power cartridge 214 on the control unit 210.

Figure 5A:
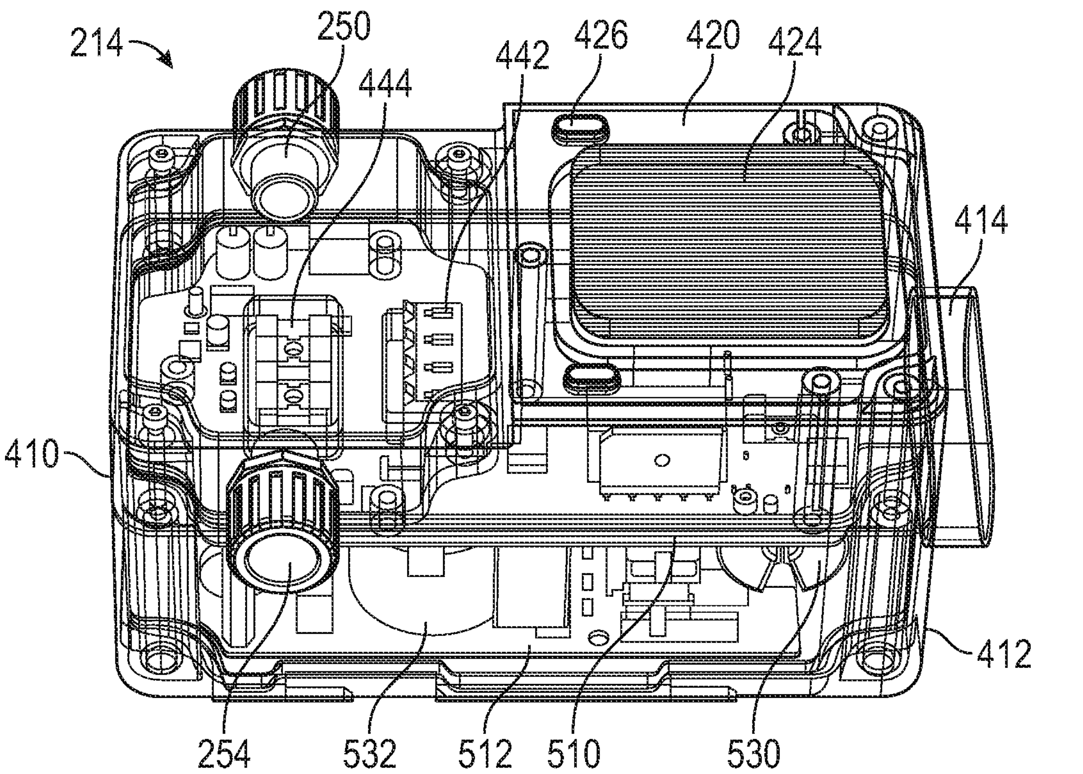
FIG. 5A is a see through perspective view of one of the modular mains power module in FIG. 2A, according to certain aspects of the present disclosure.
Figure 5B:
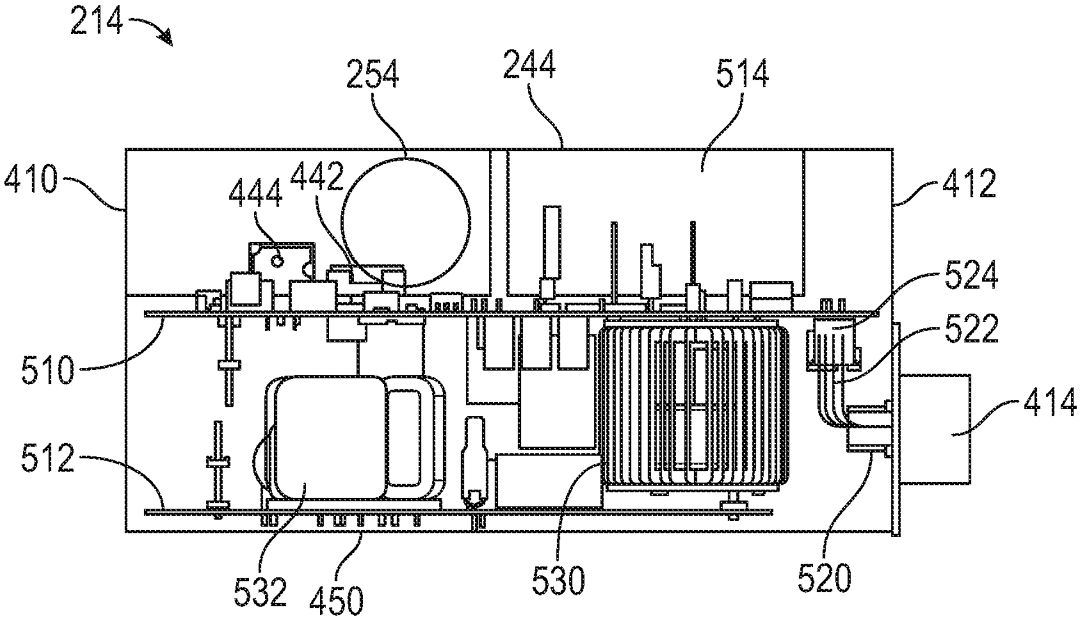
FIG. 5B is a cutaway side view of one of the modular mains power module in FIG. 2A, according to certain aspects of the present disclosure.

FIG. 5A shows a see through perspective view of the modular mains power cartridge 214. FIG. 5B shows a cross section view of the modular mains power cartridge 214. The modular mains power cartridge 214 includes a main power circuit board 510 and a lower EMI filter circuit board 512. The heat sink 422 is provided over the main power circuit board 510 to dissipate heat generated from the electronic components of the modular mains power cartridge 214. The connector 414 is connected to a corresponding interface 520. Cables 522 connect the interface 520 to a connector 524 suspended by the main power circuit board 510.

A power factor correction (PFC) transformer 530 is sandwiched between the main power circuit board 510 and the lower EMI filter circuit board 520. The main power circuit board 510 includes power components such as capacitors and power circuits that supply power to the motor 260 as well as components on the main control board. The main power circuit board 510 also supports the fuses 442 and the bank of cable connectors 444. The lower EMI filter circuit board 520 includes EMI filter circuitry as well as a low voltage inductor 532. As explained above, the example modular mains power cartridge 214 is a three phase power device. The one phase modular mains power cartridge has less components and thus only a single circuit board such as the main power circuit board.

In this example, the modular mains power cartridge 214 may be attached to the control unit 210 and drive unit 212 prior to installation of the entire opener 120 in position relative to the door. Alternatively, since the modular mains power cartridge 214 is relatively light, the modular mains power cartridge 214 may be connected to cables from the power source in the building first. The connected modular mains power cartridge 214 may then be positioned in place near the final opener position. The control unit 210 and the drive unit 212 of the opener 120 may then be lifted and installed into position. Then the already prewired modular mains power cartridge 214 can be inserted onto the installed opener. Once the opener 120 is physically installed and powered, the electronic components such as a remote control unit may be configured for accessories that will be explained below.

Figure 6B:
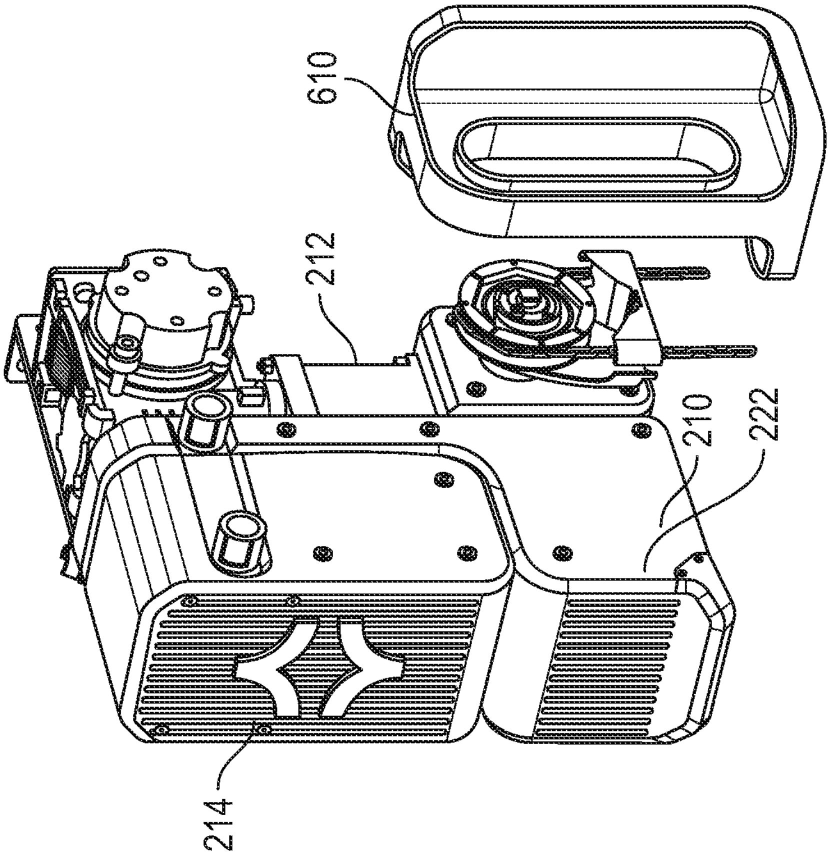
FIG. 6B is a perspective view of the control unit, the modular mains power module, and the modular handle, according to certain aspects of the present disclosure.
Figure 6A:
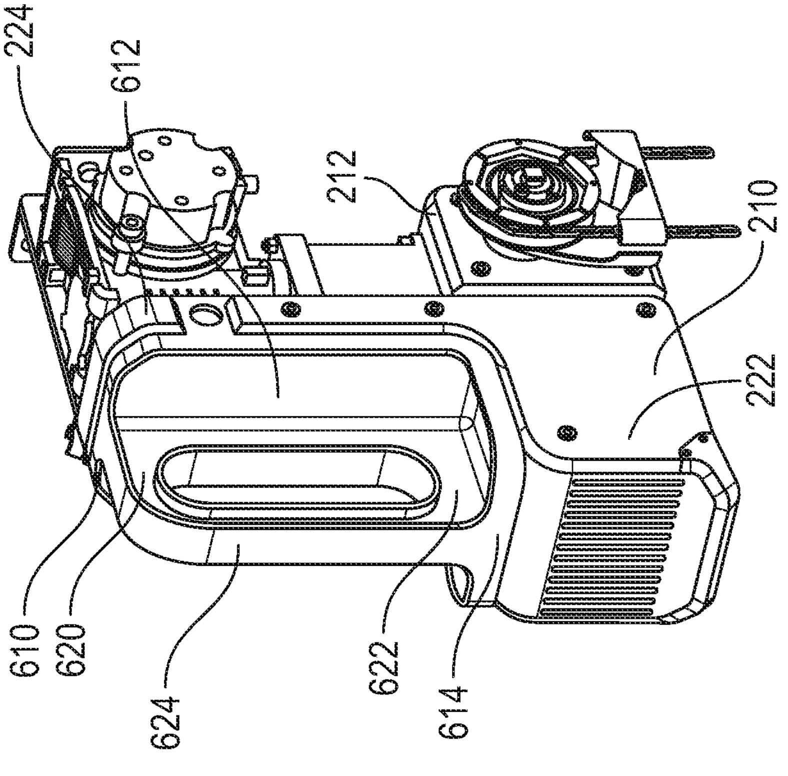
FIG. 6A is a perspective view of an attachable handle that may be interchanged with the modular mains power module in the door opener system in FIG. 2A, according to certain aspects of the present disclosure.

FIG. 6A is a perspective view of an attachable handle module 610 that may be interchanged with the modular mains power module 214 in relation to the control unit 210 of the door opener system 120 in FIG. 2A. As explained above, the modular mains power cartridge 214 may be prewired and positioned separately. In this example, the handle module 610 may be attached to the control unit 210 and the drive unit 212 as shown in FIG. 6A.

The handle module 610 includes a main plate 612 that is the length of the support section 224 of control unit 210. A support plate 614 is attached in perpendicular orientation on one end of the main plate 612. The length and width of the main plate 612 and the support plate 614 are the same size as that of the modular mains power module 214. The underside of the main plate 612 includes the rails and the latch similar to that of the modular mains power cartridge 214 in FIG. 4B that allow the handle module 610 to be attached to the support section 224. A support 620 extends from one end of the main plate 612. A second support 620 is formed on the opposite end of the main plate 612. The second support 620 is attached to the support plate 614. A handle 624 joins the supports 620 and 622.

FIG. 6B is a perspective view of the control unit 210, the modular mains power module 214, and the handle module 610. As explained above, when the handle module 610 is attached to the control unit 210, an installer may easily hold the control unit 210 and drive unit 212. The installer may thus fix the drive unit 212 to a building support with the brackets described below. Once the drive unit 212 and the control unit 210 are fixed in place, the handle module 610 may be removed and the modular mains power module 214 may be inserted on the control unit 210 as shown in FIG. 6B.

Figure 7:
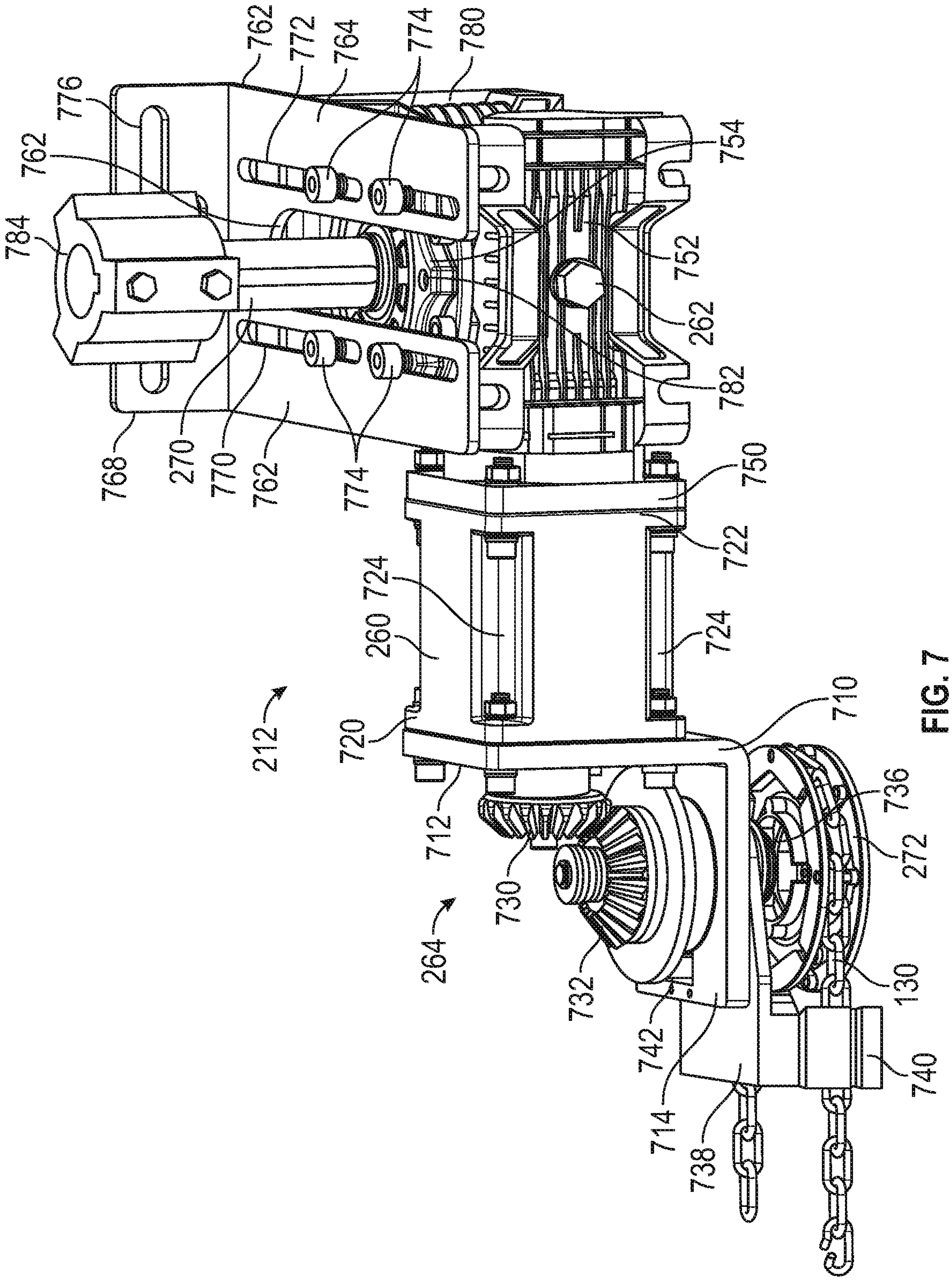
FIG. 7 is a perspective view of the components of the drive unit of the door opener system in FIG. 2A, according to certain aspects of the present disclosure.
Figure 8:
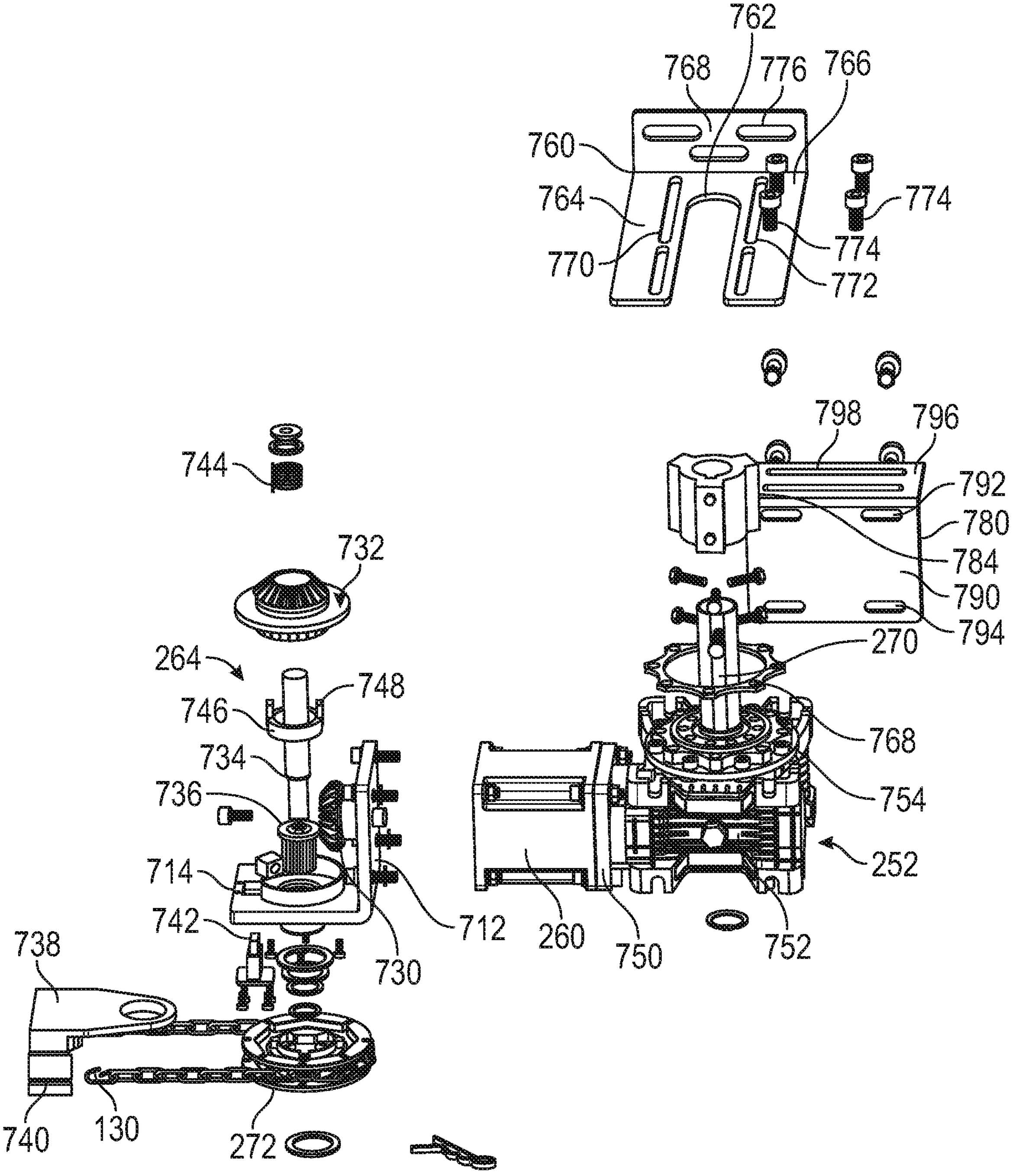
FIG. 8 is an exploded perspective view of the components of the drive unit of the door opener system in FIG. 2A, according to certain aspects of the present disclosure.

FIG. 7 is a perspective view of the mechanical components of the drive unit 212 of the door opener system 120 in FIG. 2A. FIG. 8 is an exploded perspective view of the mechanical components of the drive unit 212 in FIG. 2A. For ease of viewing the internal components of the clutch module 264, the housing 274 of the clutch module 264 is not shown in FIGS. 7-8. Power from the modular mains power cartridge 214 is supplied to the motor 260.

In this example, the motor 260 is attached to an L shaped chain wheel mounting plate 710 that has a motor plate 712 and a perpendicular shaft support plate 714. The motor 260 includes a rectangular enclosure that has opposite end members 720 and 722. The electronic components of the motor 260 are contained in the enclosure between the end members 720 and 722. A set of four recesses 724 are provided between the corners of the end members 720 and 722. The recesses 724 allow the motor 260 to be attached via bolts to other components at the end members 720 and 722. The shaft (not shown) rotated by the motor 260 extends from both the end members 720 and 722. The motor 260 may be powered through electrical leads that may be connected to a power source through the modular mains power cartridge 214. The manual chain hoist assembly 264 may be changed by removing the four bolts that connect the L bracket 712 to the motor end plate 720. The whole assembly may then be rotated by 180 degrees and the bolts may resecured after the housing 274 is removed.

In this example, the end member 720 is attached to the motor plate 712. The motor shaft is coupled to a bevel gear 730 that is supported by the motor plate 712. The perpendicular support plate 714 supports a straight bevel gear 732. The straight bevel gear 732 is oriented at a 90 degree angle from the bevel gear 730 such that the gear teeth of the bevel gears 730 and 732 mesh with each other when the bevel gear 732 is engaged with the bevel gear 730. A bevel gear shaft 734 is provided that supports the straight bevel gear 732. The other end of the bevel gear shaft 734 is attached to the hub of the chain drive wheel 272. A chain wheel shaft bush 736 is fit over the bevel gear shaft 734 to hold the shaft 734 in an aperture of the motor plate 712. The chain wheel 272 is held in position relative to the support plate 714 by a chain guide 738. The shaft 734 extends through a hole on one end of the chain guide 738. The chain guide 738 includes guide arms 740 that maintain the loop shape of the chain 130 as the chain 130 is guided around the groove in the chain wheel 272. A micro-switch 742 is attached to the support plate 714. A cam compression spring 744 is installed around the bevel gear shaft 734 near the bevel gear 732. One end of the shaft 734 includes a flange. The cam compression spring 744 sits between the flange the bevel gear 732. The spring force from the cam compression spring 744 urges the straight bevel gear 732 away from the bevel gear 730.

The shaft 734 includes a cam 746 that includes two arms 748 that engage respective grooves on the interior of the bevel gear 732. By rotating the chain wheel 272 by pulling one side or the other side of the looped chain 130, the cam 746 is rotated and causes the arms 740 to push the bevel gear 732 to engage the other bevel gear 730 and thus overcome the force of the compression spring 744. Once the bevel gears 730 and 732 are engaged, an operator may manually rotate the motor shaft of the motor 260 through the bevel gear 732 causing the bevel gear 730 to rotate the motor shaft. When the bevel gear 732 moves from the resting location to engage the bevel gear 730, the microswitch 742 is turned off and electrically isolates the motor drive to prevent electrical power to drive the motor 260 while the chain 130 is in use to rotate the main shaft 270.

Figure 9A:
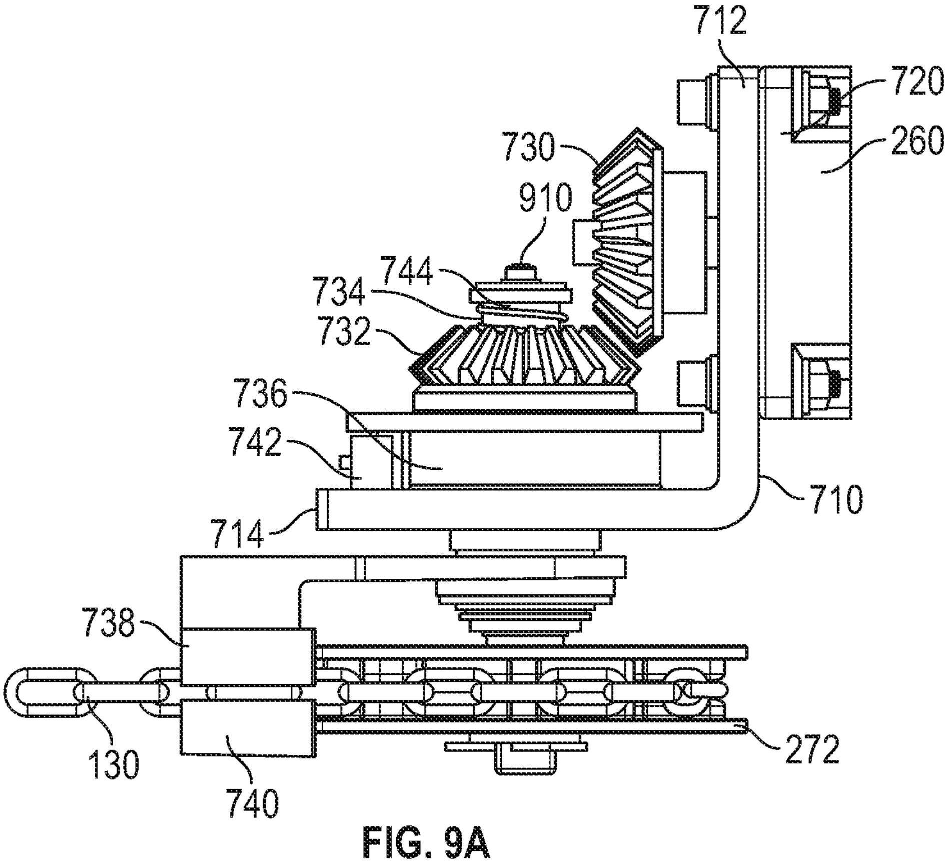
FIG. 9A is a close-up side view of the manual drive wheel assembly of the drive unit of the door opener system in FIG. 2A, according to certain aspects of the present disclosure.
Figure 9B:
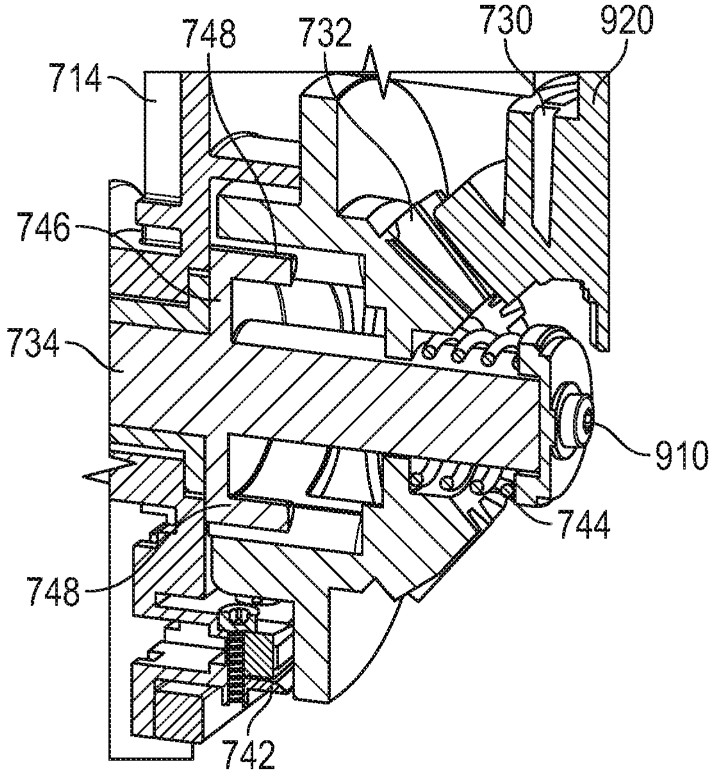
FIG. 9B is a perspective cutaway view of the manual drive wheel assembly of the drive unit in FIG. 9A with the manual drive wheel disengaged, according to certain aspects of the present disclosure.

FIG. 9A is a side view of the bevel gears 730 and 732 when the motor 260 drives the opener system 120 in normal operation. FIG. 9B is a cutaway perspective view of the bevel gears 730 and 732 when the motor 260 drives the opener system 120 in normal operation. As shown, the cam compression spring 744 pushes against a flange 910 at the end of the shaft 734. The spring force from the cam compression spring 744 forces the bevel gear 732 away from the bevel gear 730. Thus, the rotation of the motor 260 is unimpeded by the bevel gear 732 that is disengaged from the bevel gear 730 that is connected to a motor shaft 920. The arms 748 of the cam 746 are fixed in a lower position by the force of the compression spring 744 pushing the bevel gear 732 away from the flange 910. The bevel gear 732 is pushed against the microswitch 742 and thus ensures the power may be fed to the motor 760.

Figure 9C:
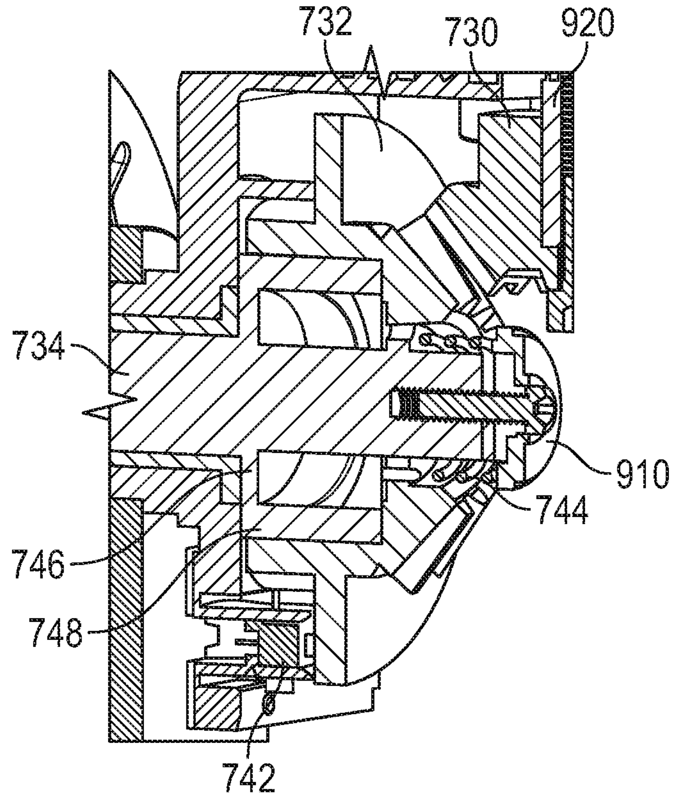
FIG. 9C is a perspective cutaway view of the manual drive wheel assembly of the drive unit in FIG. 9A with the manual drive wheel engaged, according to certain aspects of the present disclosure.

FIG. 9C is a perspective view of the bevel gears 730 and 732 when the chain 130 is pulled causing rotation of the shaft 734. When the shaft 734 is rotated, the arms 748 of the cam 746 rotate to engage internal slots to force the bevel gear 732 toward the flange 910. The movement of the bevel gear 732 compresses the cam compression spring 744, and allows the teeth of the bevel gear 732 to engage the teeth of the bevel gear 730. When the bevel gear 732 is moved toward the flange 910, the bevel gear 732 breaks contact with the microswitch 742. The microswitch 742 is thus turned off breaking electrical power to the motor 260. Further rotation of the bevel gear 732 from rotation of the shaft 734 from the chain wheel 272 being pulled by the chain 130 thus rotates the bevel gear 730. The rotation of the bevel gear 730 causes the motor shaft 920 to rotate.

Returning to FIGS. 7-8, the other end of the motor shaft of the motor 260 is attached to the worm reducer module 262 through the end member 722. The end member 722 is bolted to a corresponding support plate 750 of the worm reducer module 262. The worm reducer module 262 includes an internal gearing assembly 752 that includes interacting gears that allow rotation of the motor shaft to drive the drive shaft 270. The internal gearing assembly 752 includes a shaft mounting base 754 that is perpendicular to the motor support plate 750.

The shaft mounting base 754 of the internal gearing assembly 752 is attached to a mounting bracket 760. The mounting bracket 760 includes an aperture 762 that is defined by parallel arms 764 and 766. The arms 764 and 766 extend from a lateral support plate 768. Each of the arms 764 and 766 have slots 770 and 772 that allow the insertion of bolts 774 to attach the arms 764 and 766 to the gearing assembly 752. The lateral support plate 768 includes lateral slots 776 that allows the support plate 768 to be bolted to a back mounting bracket 780. The shaft 270 extends through a mounting bracket spacer 782. The free end of the drive shaft 270 is attached to a door shaft coupler 784 that may be attached directly to a shaft for rotating a door directly such as the door 160 in FIG. 1B. Alternatively, a sprocket may be attached to the drive shaft 270 in place of the door shaft coupler 784. In this example, both the sprocket and the coupler 784 are attached to the drive shaft using a key and slot mechanism.

The back mounting bracket 780 includes a main plate 790 that includes mounting slots 792 that may allow the top of the main plate 790 to be attached to the support plate 768. Lower mounting slots 794 allows the main plate 790 to be attached to a side of the gearing assembly 752 via bolts. A perpendicular plate 796 has a series of slots 798 that allow attachment to a support that may hold the entire opener system 120.

The installation sequence for the opener system 120 and a door such as a rolling door is facilitated by the features of the example opener system 120. An installer would first determine the power source and select the appropriate modular mains power cartridge for the power source requirements. The installer may also determine the orientation of the opener system 120 with the door and install the drive shaft on the appropriate side of the worm reducer module 262. The encoder assembly 266 is the assembled on the opposite side of the worm reducer module 262.

The user then assembles the sprocket and key onto the free end of the drive shaft 270 for engaging the drive chain for driving the sprocket of the door such as the door 110 in FIG. 1A. For other types of doors such as a sectional overhead type door 160 in FIG. 1B, the direct shaft coupler 784 may be installed on the free end of the drive shaft 270 using the key to allow direct rotation of the door. After the drive shaft 270 is attached to the drive mechanism of the door, the manual drive chain 130 is then installed on the drive wheel 272.

Figure 10B:
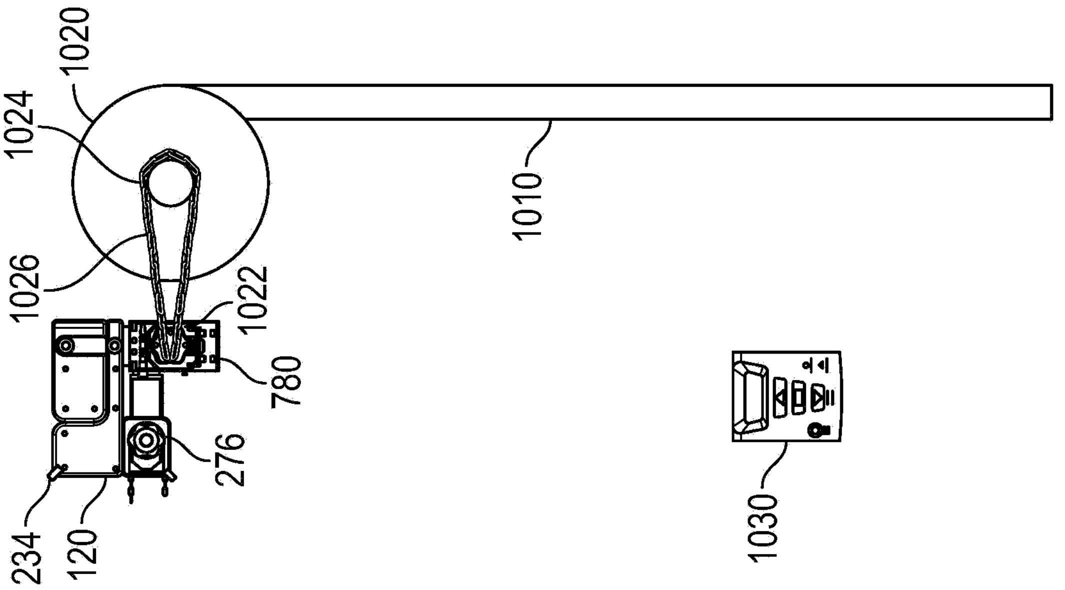
FIG. 10B is a side view of the door opener system in FIG. 2A mounted in a horizontal orientation relative to a door mechanism, according to certain aspects of the present disclosure.
Figure 10A:
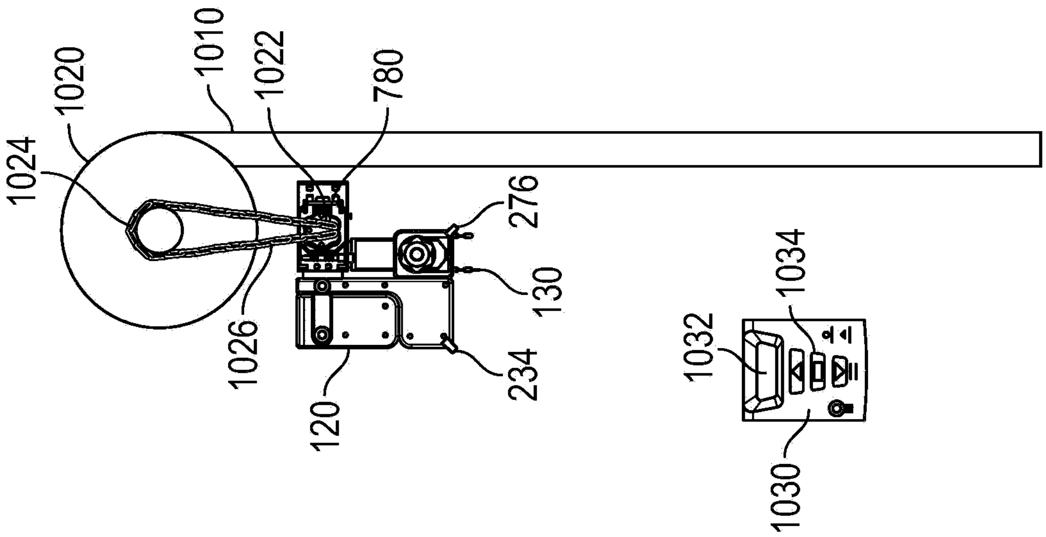
FIG. 10A is a side view of the door opener system in FIG. 2A mounted in a vertical orientation relative to a door mechanism, according to certain aspects of the present disclosure.

FIG. 10A shows the opener system 120 installed in a vertical orientation relative to a rolling door 1010. The mounting bracket 780 in FIGS. 7-8 may be bolted to any convenient support extending from a wall or ceiling or a flat surface such as a wall or ceiling. The door opener system 120 may be installed in this orientation when space is constricted in the horizontal plane relative to a door. Alternatively, the vertical orientation may be used for ease of installation. The opener system 120 may be held in place via the handles 234 and 276 while the bracket 780 is attached to the support. The door shaft 270 is attached to a sprocket 1022 that is positioned relative to a sprocket 1024 of a barrel assembly held by a hood 1020 for rotating of the door 1010. A chain 1026 is then looped around the sprocket of the drive shaft The opener system 120 may be controlled by a remote controller unit 1030. In this example, the remote controller unit 1030 includes a wireless transceiver and communicates through wireless signals to a transceiver on the control board in the opener system 120. Alternatively, the remote controller unit 1030 may have communication wires connected to a controller on the control board to communicate commands and data. The remote controller unit 1030 may be installed in any convenient location in proximity to the opener system 120 and the door 1010. As will be explained, the opener system 120 may also be controlled by a mobile device that functions as the remote controller unit 1030 or other types of devices.

In this example, the remote controller unit 1030 includes a display 1032, and control buttons 1034. The control buttons 1034 in this example include an up button, a down button, and a stop button. Pressing any of the buttons 1034 will send control signals to the control board to control the motor and thus the door 1010. The parameters of the controls of the buttons 1034 may be programmed via the display 1032.

FIG. 10B shows the opener system 120 installed in a horizontal orientation relative to the door 1010. The mounting bracket 780 may be attached to any convenient support. The door opener system 120 may be installed in this orientation when space is constricted in the vertical plane relative to a door. Alternatively, the horizontal orientation may be used for ease of installation. Similar to FIG. 10A, the remote controller unit 1030 may be installed in any convenient location in proximity to the opener system 120 and the door 1010.

Figure 11:
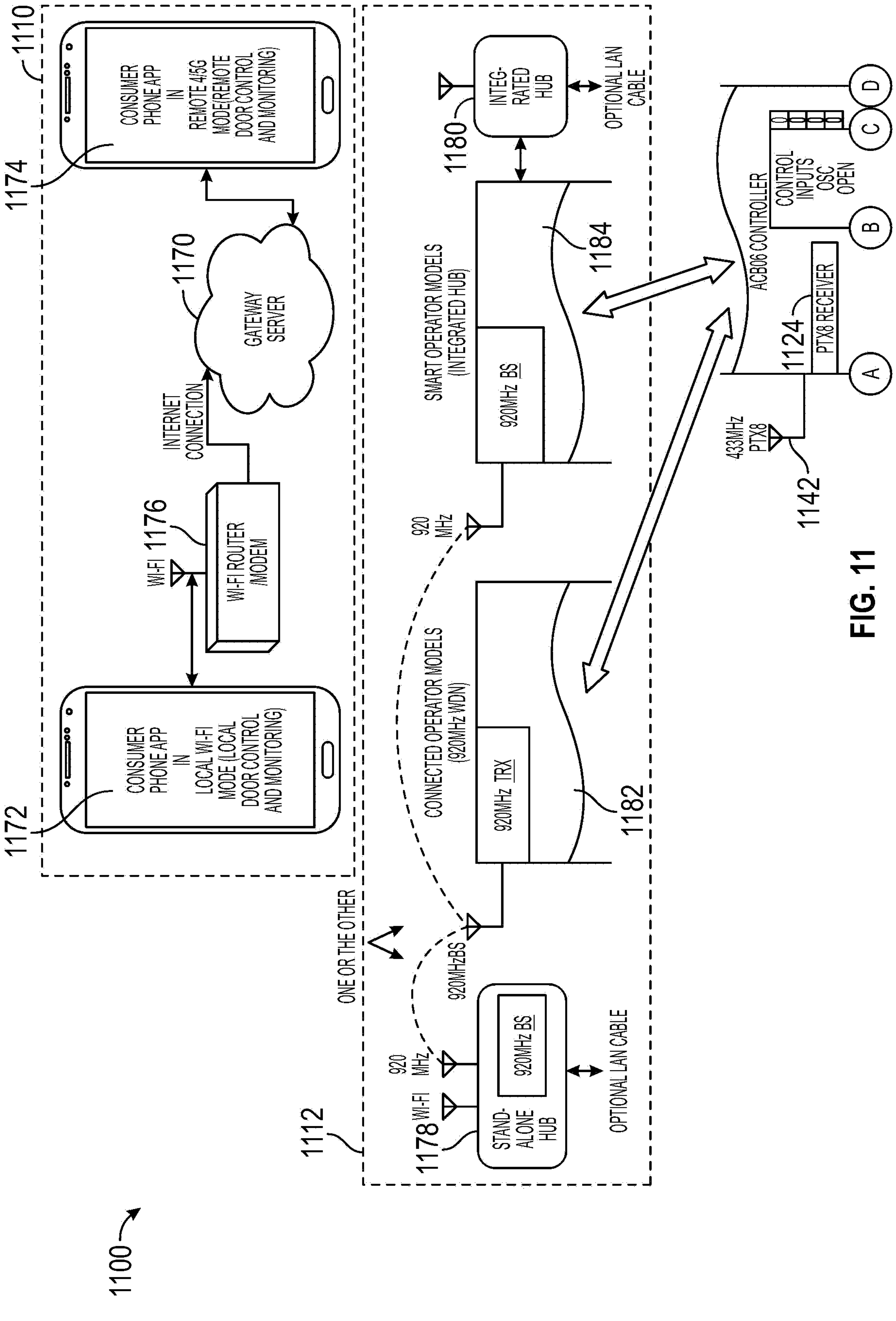
FIG. 11 is a block diagram of the electronic components of the door opener system in FIG. 2A, according to certain aspects of the present disclosure.
Figure 11:
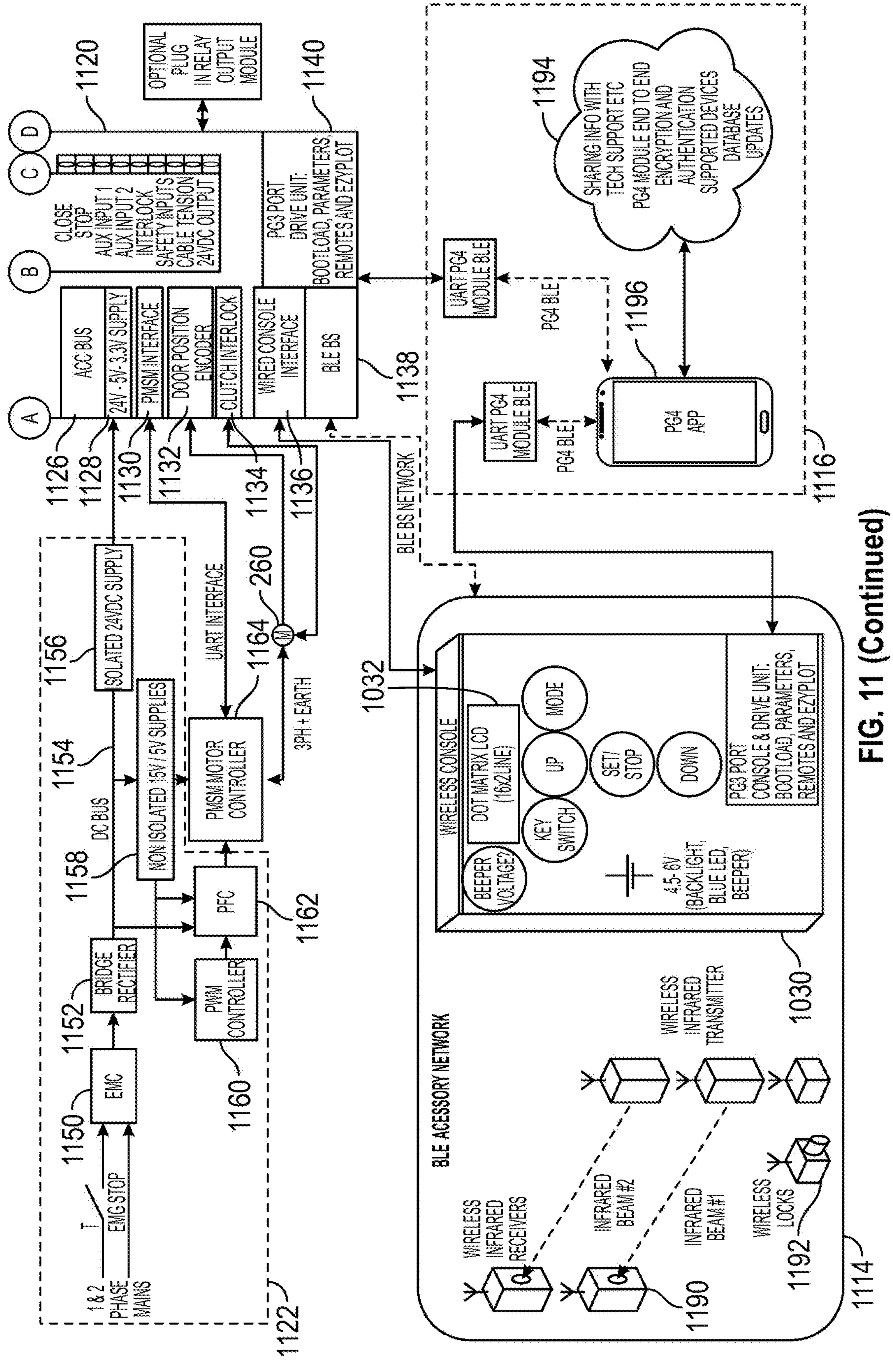

FIG. 11 is a block diagram of the electronic components 1100 for the door opener system 120 in FIG. 2A. The external electronic systems that communicate with the electronics components 1100 of the door opener system 120 includes an external wireless gateway system 1110, an integrated hub system 1112, a Bluetooth system 1114, and Cloud based diagnostics system 1116.

The electronics components 1100 of the door opener system 120 includes a controller 1120 that is supported by a control circuit board in the control compartment 222 of the control unit 212 in FIG. 2A. In this example the controller 1120 is a microcontroller, but any suitable programable device such as a processor, a programable logic controller, an application specific integrated circuit, a field programmable gate array, and the like may be used. As will be explained the controller 1120 allows user interface and control, monitors the electronic components in the system 120 as well as facilitates communication with external systems 1110, 1112, 1114 and 1116. Specifically, the controller 1120 directs a motor controller through a UART interface to control the motor 260 starting and stopping, ramp up speed, ramp down speed, and the motor running speed. The controller 1120 also interfaces to the magnetic position encoder 266 to determine the open and closed door travel limits position and saves such position data in the microcontroller flash memory. The controller 1120 has a series of inputs and outputs where external accessories can be wired into the terminal blocks that are provided. The control board allows for the commissioning and setup of the door opener. The door opener system 120 also includes a power circuit 1122 that includes components primarily located on the modular mains power cartridge 214.

In this example, the controller 1120 may connect to wireless accessories through a Bluetooth and sub-gigahertz link for the control and monitoring of wireless safety devices and WiFi network for remote and local Telecom control. Specifically, the controller 1120 has a PTXB receiver 1124, a bus interface 1126, a power supply interface 1128, a PMSM interface 1130, a door position encoder 1132, a clutch interlock 1134, a wired console interface 1136, a BLE base station 1138, and a PG3 port 1140. An antenna 1142 is coupled to the PTXB receiver 1124 for exchanging wireless data and control signals with an external device or external system as will be explained below.

The power supply interface 1128 provides high and low voltage power supply rails to the different components. The PMSM interface 1130 is a serial UART that links a motor controller on the power circuit 1122 and the main controller 1120. The main controller 1120 controls the motor parameters such as the speed, the soft start (motor ramp up rate) and the soft stop (motor ramp down), etc. The door position encoder 1132 receives position data from the magnetic encoder assembly 266 to determine the position of the door. The door position is determined by the magnetic encoder assembly 266 sensing the rotational position in angular degrees of the main drive shaft 270 rotating from the gear reduction of the worm gear reducer module 262. The worm gear reducer module 262 is driven by the motor 260 and the worm reduction ratio from the worm reducer module 262 is 50:1 in this example. The magnetic encoder assembly 266 has 12 bit resolution and can sense up to 355 degrees which is about 4000 counts over a 32 foot door which is a resolution of 0.12 inches. The encoder assembly 266 itself has a 62 T worm gear reduction to allow the counts to continue allowing the output shaft to rotate multiple times. Of course, different length doors can be measured based on the counts and the input of the door length to determine door position. The encoder assembly 266 may have different bit resolutions and different degree ranges.

The clutch interlock 1134 is coupled to the motor 260 to prevent the motor 260 from starting when the manual drive chain 130 is used. The clutch interlock 1134 is coupled to the microswitch 742 in FIG. 7 and disables power to the motor 260 when the microswitch 742 is turned off. The wired console interface 1136 allows optional wired connection to the remote controller unit 1030. The BLE base station interface 1138 allows communication with Bluetooth Low Energy devices. The PG3 port 1140 allows communication with the operating systems of mobile devices.

The power circuit 1122 includes an electromagnetic compatibility (EMC) filter 1150, a bridge rectifier 1152, a DC bus 1154, an isolated power supply 1156, a non-isolated power supply 1158, a pulse width modulator (PWM) controller 1160, a power factor correction (PFC) driver circuit 1162, and a motor controller circuit 1164. The power circuit 1122 provides power to the motor 260.

The one and two phase main power lines from the interface 414 of the modular mains power cartridge 214 are connected to the EMC filter 1150. The EMC filter 1150 filters the power signal for conducted emission compliance. The output of the EMC filter 1150 is coupled to the bridge rectifier 1152 that converts the AC power signal to a DC power that is supplied to the DC bus 1154. The DC bus 1154 supplies DC voltage to the isolated voltage supply 1156. The isolated voltage supply 1156 has a 24 V and 0.8 A output in this example that is provided to the power supply interface 1128 of the controller 1120. The DC bus 1154 also supplies DC voltage to the non-isolated voltage supply 1158 that provides power to the PWM controller 1160, the PFC circuit 1162, and the motor controller 1164. The PWM controller 1160 outputs a pulse width modulation signal to the PFC driver circuit 1162, which in turn provides a power corrected PWM signal to the motor controller system 1164. The PFC driver circuit 1162 is used to boost the 115 V AC-240 V AC power signal to provide the 360V DC bus voltage to a motor driver power module. The motor driver power module provides a steady DC Bus voltage to the motor controller system 1164 which inverts this voltage to three phases to drive the PMSM motor 260 regardless of the mains input voltage. Thus, the power circuit 1122 may be used with different mains input voltage such as between 120-240 vac. The non-isolated auxiliary voltage supply 1158 produces +15 and +5 volt supply up to 10 W for the components on the motor driver printed circuit board in this example.

The external wireless gateway system 1110 allows control through a Cloud server 1170. An application may be downloaded to a mobile device such as mobile phones 1172 and 1174. Commands for the door opener system 120 may be provided via the application executed by the mobile phones 1172 and 1174 that act as remote controllers. Thus, a user may control the door opener system 120 through the application on a mobile phone such as the mobile phones 1172 and 1174. The mobile devices may either communicate directly to the Cloud server 1170 such as the mobile phone 1174. Alternatively, the mobile device may communicate through a WiFi router/modem 1176 to the Cloud server 1170 such as the example mobile phone 1172.

In this example, the PG-4 configurator is a software application that can be downloaded to a mobile device such as an Apple or Android phone or a tablet device. Alternatively, the software application may be executed by other computing devices such as a workstation, a personal computer, or a laptop computer. The example configurator application includes different interfaces relating to set up, operation, and analysis of the door opener system 120. The application may include a series of interfaces that assist an installer during the commissioning/installation of the door opener system. The application will enable the user to adjust and configure any door operating parameters like travel speed, auto-close, and other timing functions. The application also allows new firmware to be uploaded. The application may manage the adding, naming, and deletion of key fobs. The application also allows a user to use diagnostic tools to interrogate the opener for data to allow the user to diagnose fault situation to inform and allow fixes. The PG-4 can be connected to the openers with a plugin wired harness or interface wirelessly. Another series of interfaces allow a user to edit opener parameters. In this example, an operator can configure the opener door travel speed to suit the door weight and size, edit speed ramp up ramp down for soft start and soft stop, edit auto-close delay time, edit safety beam triggered auto-close, etc. The configurator software may also be updated through the wireless network.

The integrated hub system 1112 allows the use of either a stand alone hub 1178 or an integrated hub 1180. Either hub 1178 or 1180 may be tied to a network via a LAN cable. The integrated hub system 1112 allows either connected operator models such as a remote controller 1182 or a smart operator device such as the device 1184 with an onboard hub 1180 through on board wireless transceivers.

The Bluetooth system 1114 allows integration of different Bluetooth devices with the opener system 120. As explained above, the remote control unit 1030 may communicate with the controller 1120 through a Bluetooth link established between the remote control unit 1030 and the BLE BS interface 1138. Commands from the remote controller unit 1030 may be communicated to the controller 1120 within Bluetooth range. Other Bluetooth devices may also be integrated via the Bluetooth system 1114. One example of Bluetooth devices that may communicate with the opener system 120 is a set of optical detectors 1190. The optical detectors 1190 have an infrared transmitter emitting an infrared beam and an infrared receiver that receives the beam. Both transmitter and receiver include a Bluetooth transmitter. The optical detectors 1190 may be set up as a detector whether an object is under the door, thus breaking the beam. The interruption of the beam is communicated via the Bluetooth link and the controller 1120 may be programmed to reverse the motor 260 to prevent closing the door on the object.

Another Bluetooth device is a lock device 1192. The example lock device 1192 is an electro-mechanical device that is connected to the opener via a Bluetooth link. When the door is in the fully closed position the lock device 1192 may activate a throw bolt to lock the door to the door guide tracks. The lock bolt is withdrawn when the opener system 120 receives a command to open.

The Cloud based diagnostics system 1116 includes a Cloud server 1194 that may be accessed by technical support personnel. The Cloud server 1194 may be accessed by a mobile device 1196. In this example, a diagnostics application maybe downloaded on the mobile device 1196. The mobile device 1196 in this example has a Bluetooth transceiver that communicates through the PG3 port 1136 of the controller 1120.

Figure 12:
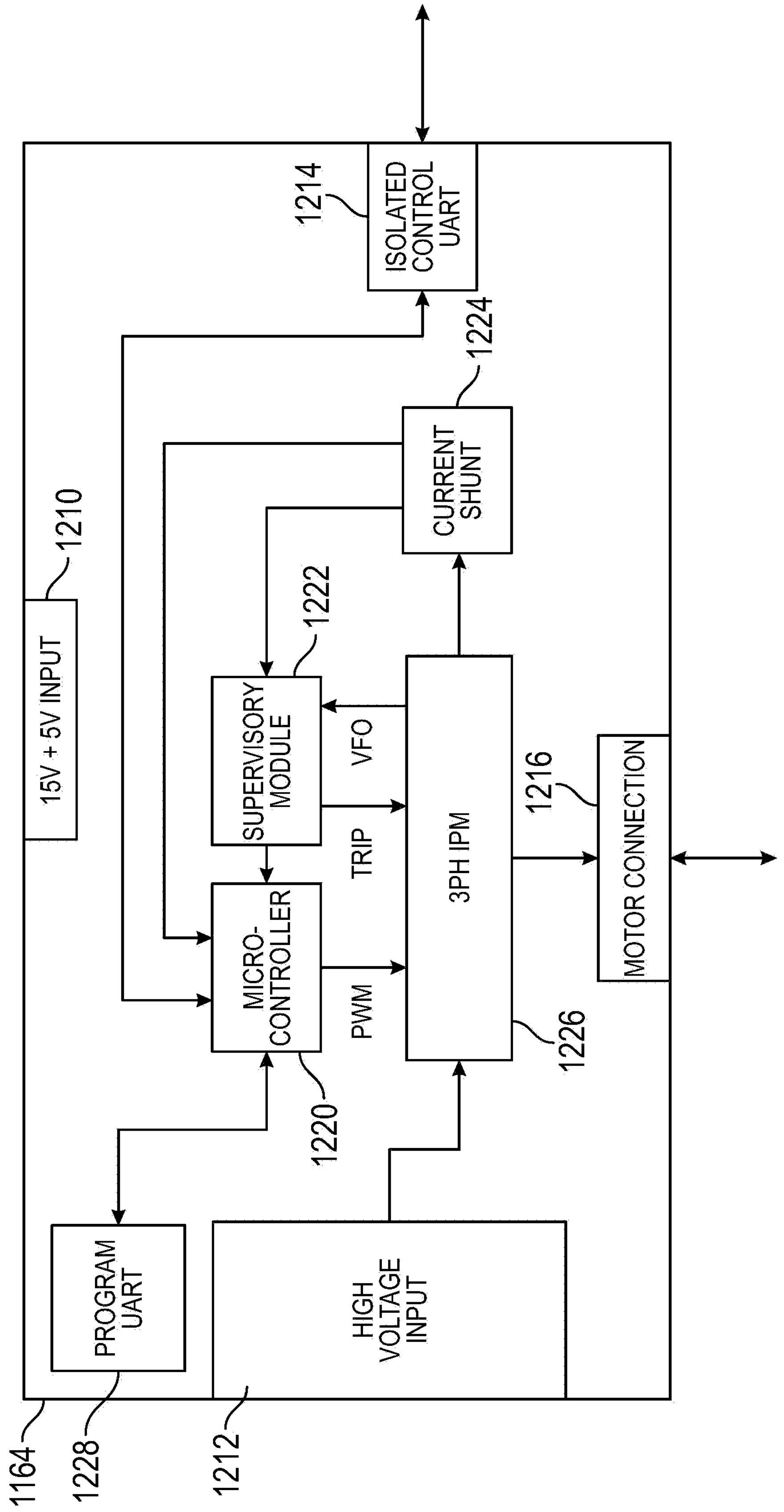
FIG. 12 is a block diagram of the motor controller circuit in FIG. 11, according to certain aspects of the present disclosure.

FIG. 12 shows a block diagram of the motor controller system 1164 in FIG. 11. The motor controller system 1164 includes a low voltage input 1210 that receives voltage output from the non-isolated voltage supply 1158 and a high voltage input 1212 that receives input signals from the PFC driver circuit 1162. A control interface 1214 communicates with the PMSM interface 1128 of the controller 1120. In this example, the control interface 1214 is a programming UART interface for receiving programming instructions and controlling UART communication for receiving and relaying commands and status to the main controller 1120 in FIG. 11. A motor connection 1216 provides an electrical connection to the motor 260.

The motor controller system 1164 includes a microcontroller 1220 that is programmed as a motor controller, a supervisory module 1222, a current shunt 1224, and a 3 phase intelligent power module (IPM) 1226. A UART program memory 1228 provides firmware programs for programming the microcontroller 1220. The UART is the serial interface between the motor driver system 1164 and the main controller 1120. The main controller 1120 sends motor control commands to the motor controller 1220 and receives back status information on the condition of the motor through the UART. In this example, the controller 1120 is configured as a UART controller that provides a serial interface between the motor driver and the main controller for system control. The microcontroller 1220 is a motor driver microcontroller that is responsible to provide suitable signals for the IPM 1226. The microcontroller 1220 calculates the current feedback from a leg shunt such as the shunt 1224 and other data for control safety purposes such as overcurrent, over voltage and over temperature conditions. The supervisory module 1222 provides information about max current, voltage and temperature over the IPM 1226.

The IPM 1226 in this example includes a six transistor circuit (e.g., IGBTs or MOSFETs) including protection element and supervisory section over module. In this example, the motor 260 is a 3 phase motor. Motor speed control is based on pulse width modulation (PWM) signal from the microcontroller 1220 to the IPM 1226.

Figure 13A:
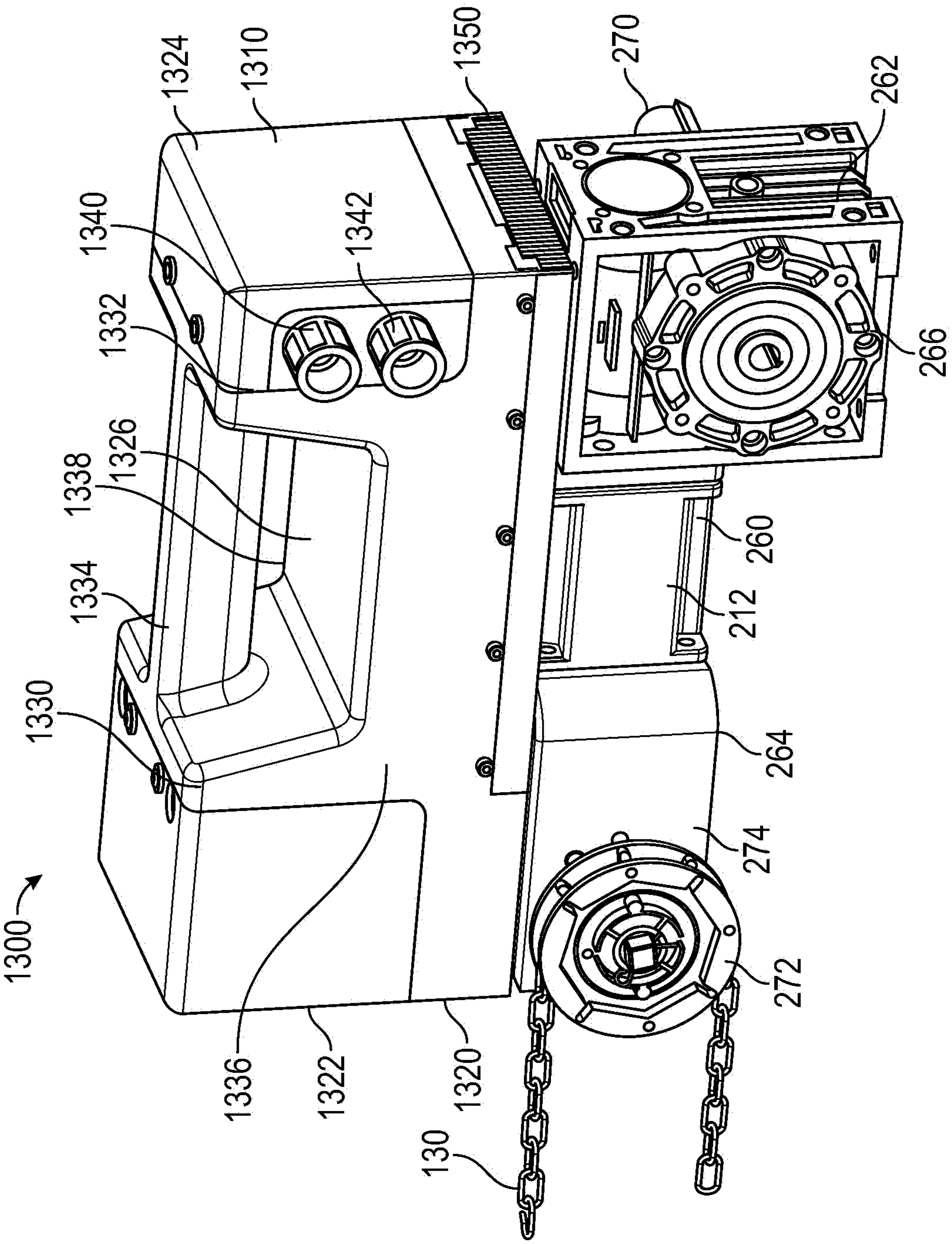
FIG. 13A is a perspective view of another example modular door opener system, according to certain aspects of the present disclosure.
Figure 13B:
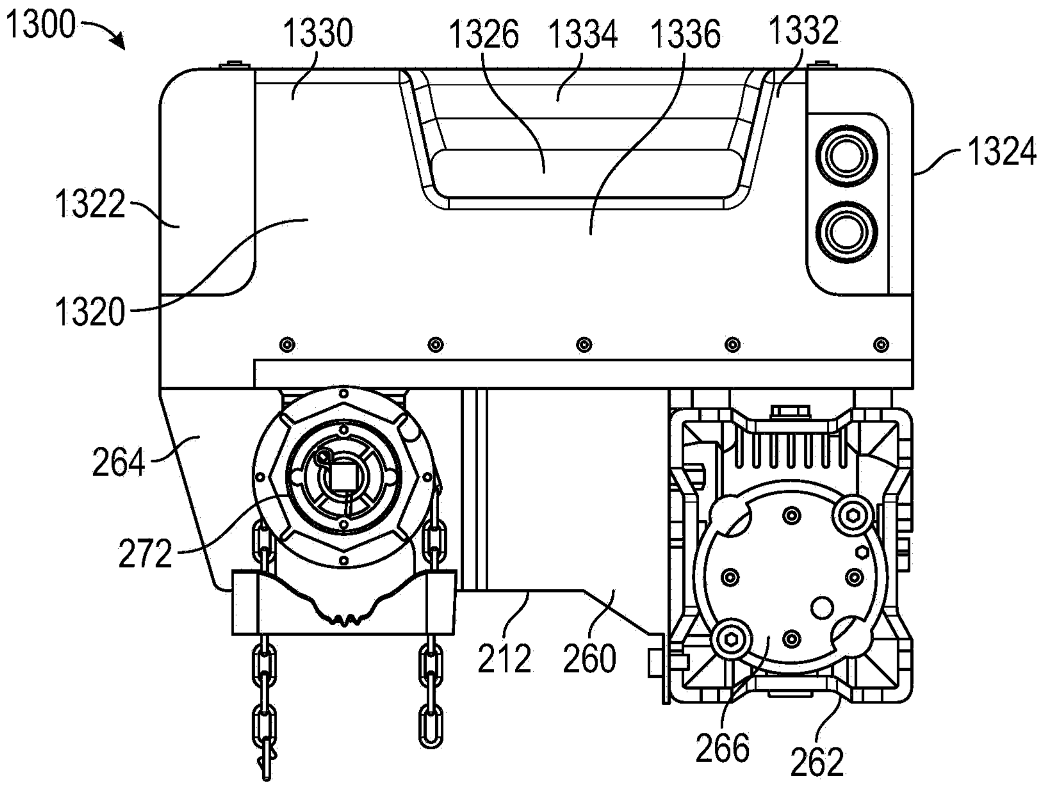
FIG. 13B is a side view of the modular door opener system in FIG. 13A, according to certain aspects of the present disclosure.
Figure 13C:
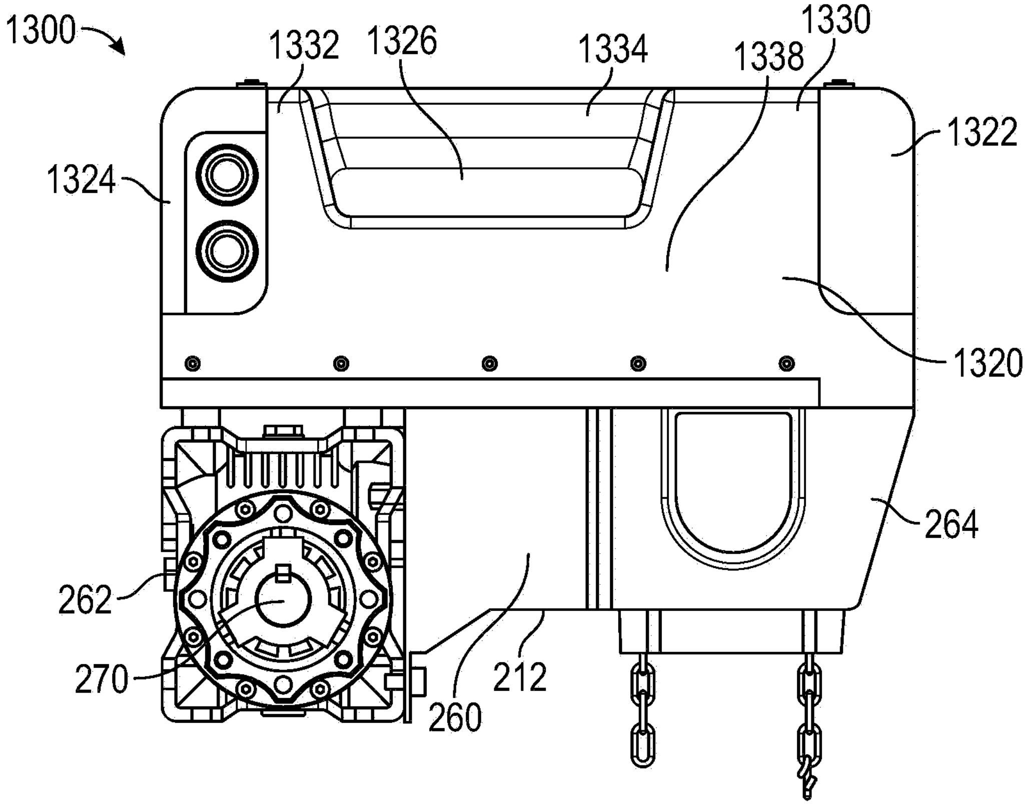
FIG. 13C is an opposite side view of the modular door opener system in FIG. 13A, according to certain aspects of the present disclosure.

FIG. 13A is a perspective view of another door opener system 1300. FIG. 13B is a side view of the door opener system 1300 and FIG. 13C is an opposite side view of the door opener system 1300. The door opener system 1300 includes a power unit 1310 that is attached to a drive unit that is identical to the drive unit 212 shown in FIG. 2A. The power unit 1310 provides control signals and supplies electrical power to a motor in the drive unit 212. The power unit 1310 includes a main body 1320 that includes a control board cover 1322 and a main power cover 1324. Each of the covers 1322 and 1324 in this example are secured to the main body 1320 by fasteners such as screws. The main body 1320 includes an indented area 1326 that is defined by main supports 1330 and 1332. An integrated handle 1334 joins the main supports 1330 and 1332. The body 1320 includes two side panels 1336 and 1338 that are shaped to define the indented area 1326 and areas for the covers 1322 and 1324. Two power ports 1340 and 1342 are positioned on the side panel 1336 near the main support 1332. Two power ports 1344 and 1346 are positioned on the opposite side panel 1338. In this example, the power ports 1340, 1342, 1344, and 1346 are protected by a plug until use. Power couplings may thus be attached to either side of the main body 1320. A heat sink 1350 is attached at the bottom of the main body 1320 to prevent overheating of the electronic components in the power unit 1310.

Figure 14:
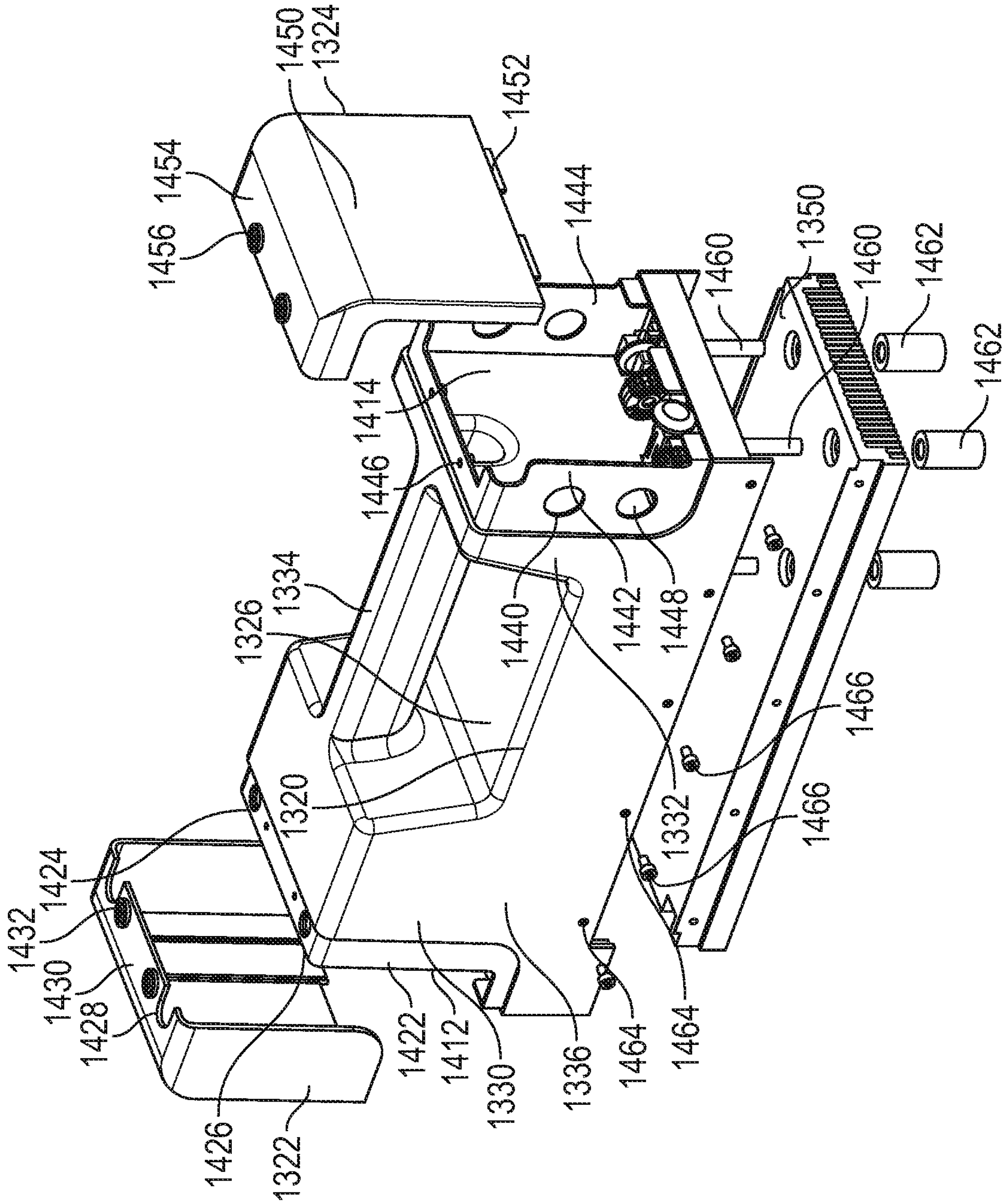
FIG. 14 is an exploded perspective view of the power unit of the door opener system in FIG. 13A, according to certain aspects of the present disclosure.
Figure 15:
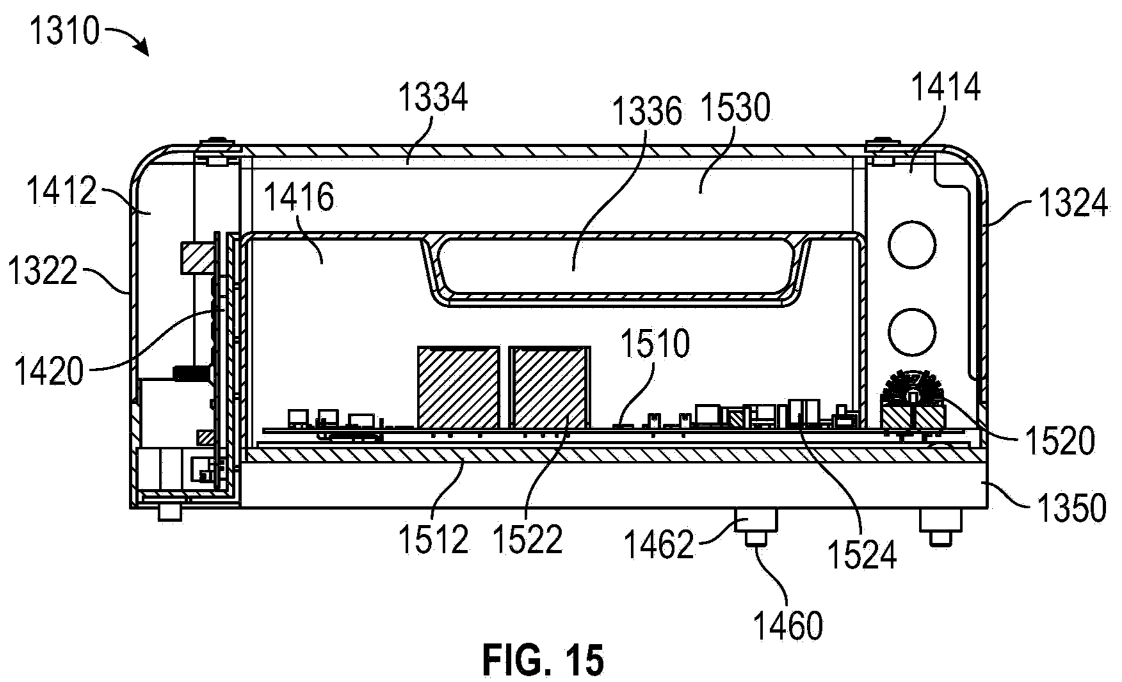
FIG. 15 is a cutaway view of the power unit of the door opener system in FIG. 13A, according to certain aspects of the present disclosure.

FIG. 14 is an exploded perspective view of the power unit 1310. FIG. 15 is a cutaway side view of the power unit 1310. As shown in FIGS. 14-15, one end of the body 1320 of the power unit 1310 includes a control board compartment 1412 that is partially defined by the main support 1330 and enclosed by the cover 1322. The opposite end of the body 1320 also includes a power supply compartment 1414 that is partially defined by the main support 1332. A main power component compartment 1416 is defined by the interior of the body 1320 and the area between the supports 1330 and 1332.

The control board compartment 1412 holds a main control board 1420 that includes electronic components for controlling the mechanical components of the drive unit 212. As will be explained the main control board 1420 includes communication circuits and control logic for controlling the operation of the door opener system 1300, communicating with external systems, as well as storing operational data for diagnostic purposes. The compartment 1412 is framed by a recessed border 1422 that extends from the main support 1330. A top edge 1424 includes mounting holes 1426 that mate with notches 1428 on a top panel 1430 of the cover 1322. The cover 1322 may be secured via fasteners that are inserted in the notches 1428 to the mounting holes 1426. Additional screws 1432 may be used to attach the top panel 1430 of the cover 1322 to the top edge 1424 of the recessed border 1422.

The power supply compartment 1414 is bounded by an interior frame 1440 that includes two recessed side panels 1442 and 1444. A top support member 1446 joins the top of the side panels 1442 and 1444. The side panels 1442 and 1444 includes holes 1448 that allow the power ports 1342 and 1344 in FIG. 13A to be accessed. The cover 1324 has a main panel 1450 with a bottom edge having tabs 1452 that may be inserted near the bottom edge of the power supply compartment 1414. A top panel 1454 may be attached via screws 1456 to the top support member 1446.

A series of support rods 1460 extend from the bottom of the power supply unit 1310. The support rods 1460 are inserted in corresponding holes that extend through the heat sink 1350. The ends of the support rods 1460 that extend through the heat sink 1350 are attached to locking cylinders 1462 that hold the heat sink 1350 in position under the power supply unit 1310. Each of the sides 1336 and 1328 include a series of screw holes 1464 near the respective bottom edges of the side. The bottom edge of the sides 1336 and 38 overlap the sides of the heat sink 1350. Additional screws 1466 are inserted through the screw holes 1464 to attach the sides 1336 and 1338 to the respective sides of the heat sink 1350.

As shown in FIG. 15, the main power component compartment 1416 encloses a main power board 1510 that rests on a bottom plate 1512. The bottom plate 1512 is in thermal contact with the heat sink 1350. The main power board 1510 includes power components such as a transformer 1520, a series of capacitors 1522, and power circuits 1524 that supply power to the motor 260 as well as components on the main control board 1420. Heat generated from the components on the main power board 1510 is transferred through the bottom plate 1512 to the heat sink 1350.

The integrated handle 1334 allows an installer to hold and position the body 1320 and attached mechanical drive unit 212 of the door opener system 1300 with one hand while keeping one hand free for tool use or other requirements. The handle 1334 includes an internal conduit 1530 that allows control wiring to be inserted from the power compartment 1414 to supply power to the main control board 1420. Alternatively, the handle 1334 may be a detachable component with a conduit.

Figure 16:
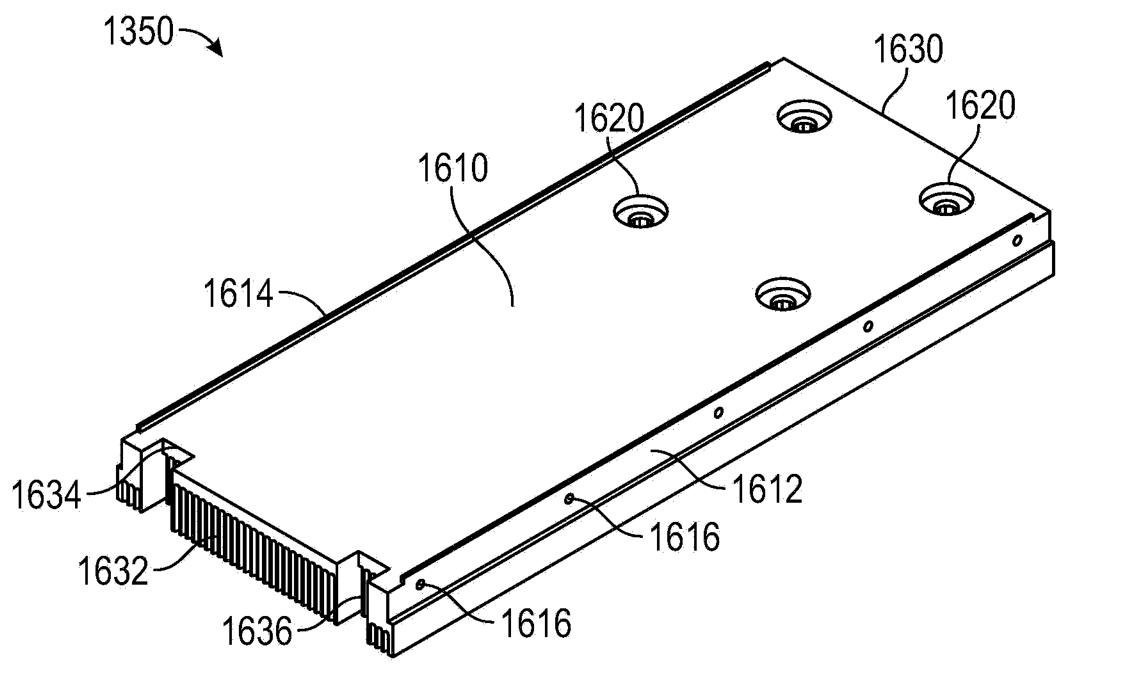
FIG. 16 is a perspective view of the heat sink of the door opener system in FIG. 13A, according to certain aspects of the present disclosure.

FIG. 16 is a perspective view of the heat sink 1350. The heat sink 1350 is fabricated from a heat absorbing material such as aluminum. The heat sink 1350 transfers heat generated from the main power board 1510 to allow heat to be dissipated to the surrounding environment. The heat sink 1350 is generally rectangular in shape and includes a top surface 1610 that is in thermal contact with the bottom plate 1412 of the body 1320. A pair of recessed side surfaces 1612 and 1614 are provided to mate with the bottom edges of the sides 1336 and 1338 of the body 1320. The recessed side surfaces 1612 and 1614 include a series of screw holes 1616 to allow the sides 1336 and 1338 to be attached via screws to the heat sink 1350. A series of four through holes 1620 are provided to accommodate the corresponding support rods 1460. The heat sink 1650 includes a front end 1630 and an opposite rear end 1632 that is inserted into the body 1320. The rear end 1632 includes a series of fins that increase surface area to dissipate heat. Two registration notches 1634 and 1636 are formed from the fins that assist in aligning the heat sink 1350 properly relative to the body 1320.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A door opener system, comprising:

a motor;

a mechanical reducer drive assembly mechanically coupled to the motor to drive a shaft for rotating a door mechanism, wherein the mechanical reducer drive assembly includes a plurality of worm gears that mechanically couple the motor to the shaft;

a control unit attached to the motor and mechanical reducer drive assembly, the control unit controlling the motor speed; and a power interface on the control unit, the power interface configured to be coupled to one of a plurality of identically sized modular mains power cartridges, each of the modular mains power cartridges allowing different power sources to provide power to the motor.

2. The system of claim 1, wherein the control unit includes a control board compartment holding the control unit, and a power cartridge support, wherein each of the plurality of modular mains power cartridges are configured to be positioned on the power cartridge support in proximity to the control board compartment.

3. The system of claim 1, further comprising a remote controller in communication with the control unit, wherein the remote controller communicates via a transceiver to the control unit to operate the motor to drive the shaft.

4. The system of claim 3, wherein the control unit communicates with the remote controller via one of a wired connection or a wireless connection.

5. The system of claim 4, wherein the remote controller includes a wireless transceiver that is one of a wireless network transceiver or a short range wireless transceiver.

6. The system of claim 3, wherein the remote controller is a mobile computing device.

7. The system of claim 1, wherein the motor is a permanent magnet synchronous motor.

8. The system of claim 1, further comprising a clutch module including a drive wheel mechanically coupled to the motor, wherein rotation of the drive wheel rotates the shaft.

9. The system of claim 8, wherein the motor includes a motor shaft having a first end mechanically coupled to the mechanical reducer assembly and a second end coupled to a motor bevel gear, wherein the drive wheel is coupled to a manual drive shaft including a drive bevel gear, wherein the drive bevel gear is selectively engageable to the motor bevel gear to allow rotation of the drive wheel to rotate the shaft and disengaged from the motor bevel gear when power to the motor rotates the motor shaft.

10. The system of claim 9, wherein the drive bevel gear is moveable between a disengaged position on the manual drive shaft and an engaged position on the manual drive shaft by rotating the drive wheel.

11. The system of claim 1, further comprising a magnetic encoder module coupled to the mechanical reducer drive, the magnetic encoder module operable to determine the rotation speed of the shaft.

12. The system of claim 1, further comprising a modular handle that is attachable to the power unit in place of the modular mains power cartridge.

13. A modular door opener comprising:

a main body defining a control compartment and a support section;

a first modular mains power cartridge insertable on the support section to provide power when connected to an external power source, wherein the control compartment includes a power connector mateable with a connector on the first modular mains power cartridge, and wherein the support section includes a registration feature mating with a corresponding feature on the first modular mains power cartridge to hold the first modular mains power cartridge to the support section;

a second modular mains power cartridge insertable on the support section to provide power when connected to another type of external power source;

a controller;

a motor coupled to the main body, opposite the control compartment, the motor powered by the modular mains power cartridge and controlled by the controller; and a worm reducer including a drive shaft mechanically coupled to the motor.

14. The modular door opener of claim 13, wherein the second modular mains power cartridge includes a connector mataeable with the power connector of the control compartment.

15. The modular door opener of claim 13, further comprising a modular handle that is attachable to the main body via the registration feature in place of the modular mains power cartridge.

16. The modular door opener of claim 13, further comprising a clutch module including a drive wheel mechanically coupled to the motor, wherein rotation of the drive wheel rotates the shaft.

17. The modular door opener of claim 13, wherein the motor is a permanent magnet synchronous motor.

18. The modular door opener of claim 13, further comprising a magnetic encoder module coupled to the worm reducer, the magnetic encoder module operable to determine the rotation speed of the shaft.

19. The modular door opener of claim 13, wherein the controller is in communication with a remote controller to receive a signal to control the motor.

20. A door opener system, comprising:

a motor;

a mechanical reducer drive assembly mechanically coupled to the motor to drive a shaft for rotating a door mechanism;

a control unit attached to the motor and mechanical reducer drive assembly, the control unit controlling the motor speed;

a power interface on the control unit, the power interface configured to be coupled to one of a plurality of identically sized modular mains power cartridges, each of the modular mains power cartridges allowing different power sources to provide power to the motor; and a modular handle that is attachable to the power unit in place of any of the plurality of modular mains power cartridges.

* * * * *